US012628191B2

(12) United States Patent
Liu et al.

(10) Patent No.: US 12,628,191 B2
(45) Date of Patent: May 12, 2026

(54) HANDLING RESOURCE COLLISIONS BASED ON SIDELINK FEEDBACK TRANSMISSION OPPORTUNITIES

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 18/352,916

(22) Filed: Jul. 14, 2023

(65) Prior Publication Data

US 2025/0024473 A1     Jan. 16, 2025

(51) Int. Cl.
    *H04W 72/40*     (2023.01)
    *H04L 5/00*     (2006.01)
    *H04W 76/28*     (2018.01)

(52) U.S. Cl.
    CPC ........... *H04W 72/40* (2023.01); *H04L 5/0055* (2013.01); *H04W 76/28* (2018.02)

(58) Field of Classification Search
    CPC .... H04W 72/40; H04W 76/28; H04L 5/0055; H04L 1/1854; H04L 1/1671; H04L 1/1864
    USPC ........................................................ 370/329
    See application file for complete search history.

(56) References Cited

U.S. PATENT DOCUMENTS

| | | | | |
|---|---|---|---|---|
| 2020/0196255 A1* | 6/2020 | Cheng | ................... | H04L 5/0092 |
| 2020/0205166 A1* | 6/2020 | Huang | ................ | H04W 68/005 |
| 2020/0403737 A1* | 12/2020 | Yeo | ..................... | H04W 52/325 |
| 2022/0159709 A1* | 5/2022 | Xue | ................... | H04W 74/002 |

OTHER PUBLICATIONS

International Search Report and Written Opinion—PCT/US2024/035805—ISA/EPO—Oct. 31, 2024.
Qualcomm Incorporated: "Physical Channel Design for Sidelink on Unlicensed Spectrum", 3GPP TSG-RAN WG1 #113, R1-2305338, 3rd Generation Partnership Project, Mobile Competence Centre, 650, Route Des Lucioles, F-06921 Sophia-Antipolis Cedex, France, vol. 3GPP Ran 1, No. May 22, 2023-May 26, 2023, May 14, 2023, 39 Pages, XP052376416, paragraphs [0028]-[0033], figures 24-29.

* cited by examiner

*Primary Examiner* — Mang Hang Yeung
(74) *Attorney, Agent, or Firm* — Holland & Hart LLP

(57)     ABSTRACT

Methods, systems, and devices for wireless communication are described. In some systems, a user equipment (UE) may receive a first sidelink message associated with a sidelink feedback transmission occasion and a second sidelink message also associated with the sidelink feedback transmission occasion. The UE may provide a type of feedback information via the sidelink feedback transmission occasion based on the first sidelink message and the second sidelink message both being associated with the sidelink feedback transmission occasion. The provided type of feedback information may be based on a quantity of one or more additional sidelink feedback transmission occasions subsequent to the sidelink feedback transmission occasion that are also available for transmission of either first feedback associated with the first sidelink message or second feedback associated with the second sidelink message.

30 Claims, 12 Drawing Sheets

225 — Sidelink Message

230 — Feedback Information

200

510

520

515

505

500

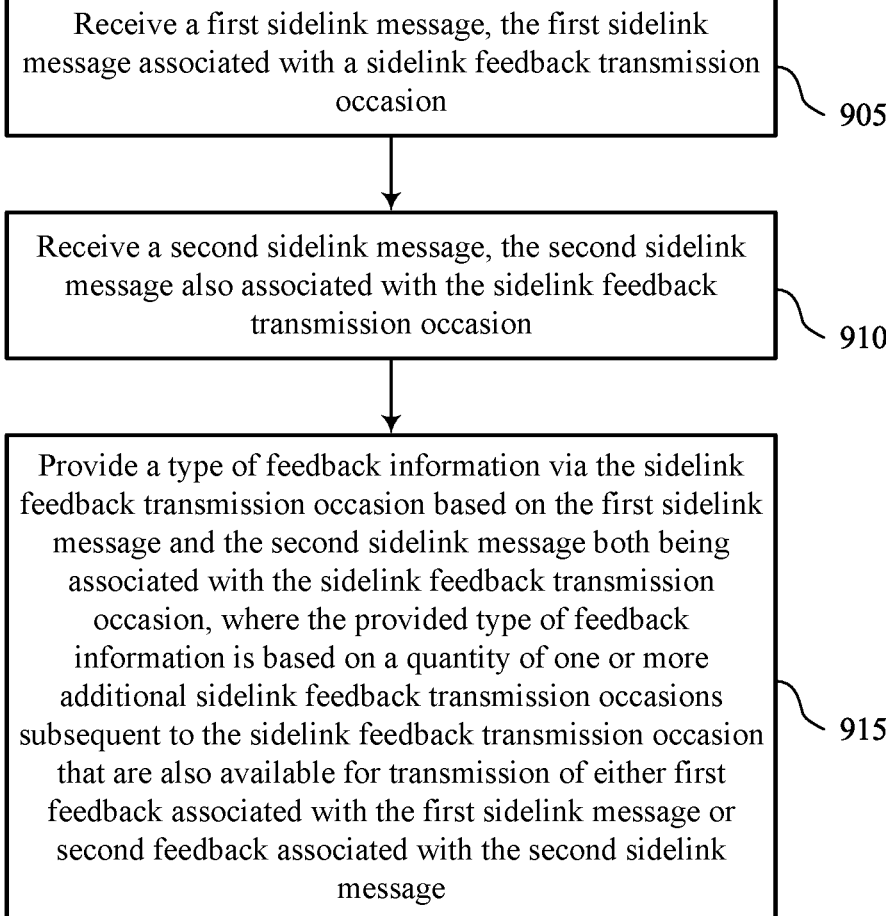

Receive a first sidelink message, the first sidelink message associated with a sidelink feedback transmission occasion

905

Receive a second sidelink message, the second sidelink message also associated with the sidelink feedback transmission occasion

910

Provide a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message

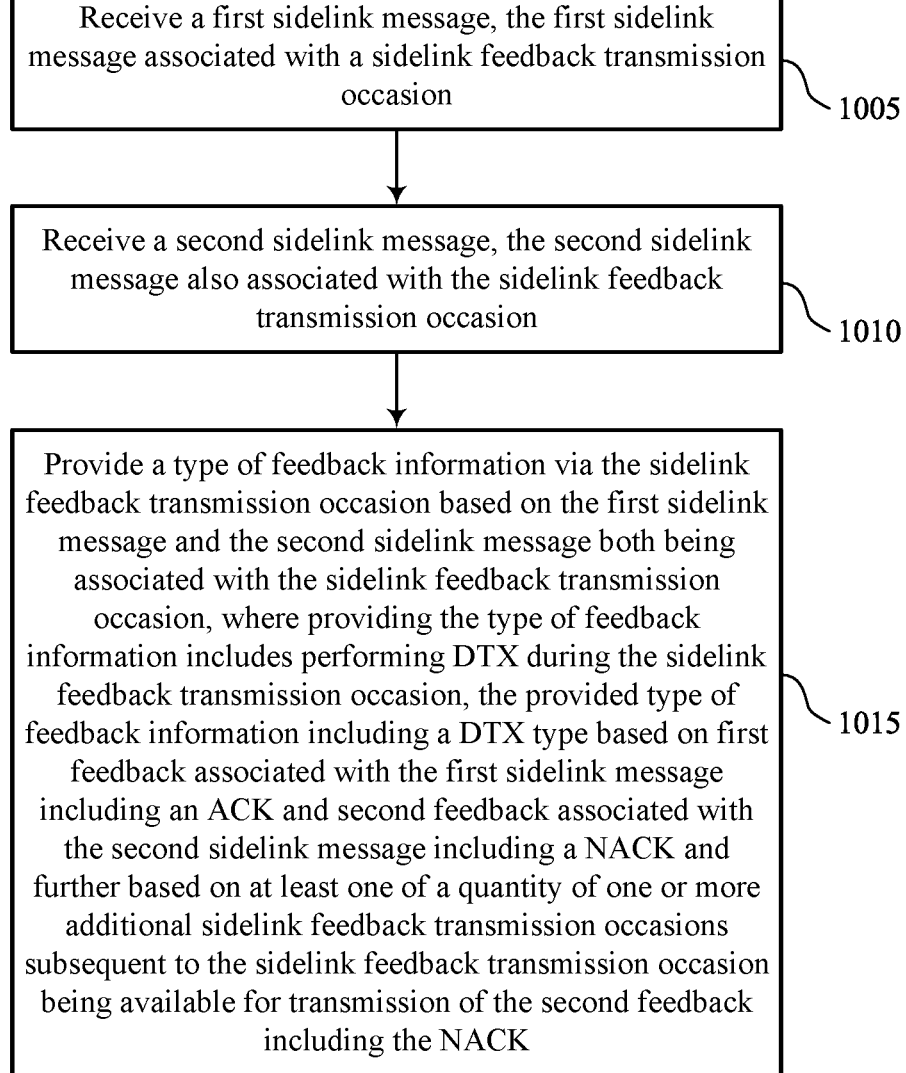

Receive a first sidelink message, the first sidelink message associated with a sidelink feedback transmission occasion

1005

Receive a second sidelink message, the second sidelink message also associated with the sidelink feedback transmission occasion

1010

Provide a type of feedback information via the sidelink feedback transmission occasion based on the first sidelink message and the second sidelink message both being associated with the sidelink feedback transmission occasion, where providing the type of feedback information includes performing DTX during the sidelink feedback transmission occasion, the provided type of feedback information including a DTX type based on first feedback associated with the first sidelink message including an ACK and second feedback associated with the second sidelink message including a NACK and further based on at least one of a quantity of one or more additional sidelink feedback transmission occasions subsequent to the sidelink feedback transmission occasion being available for transmission of the second feedback including the NACK

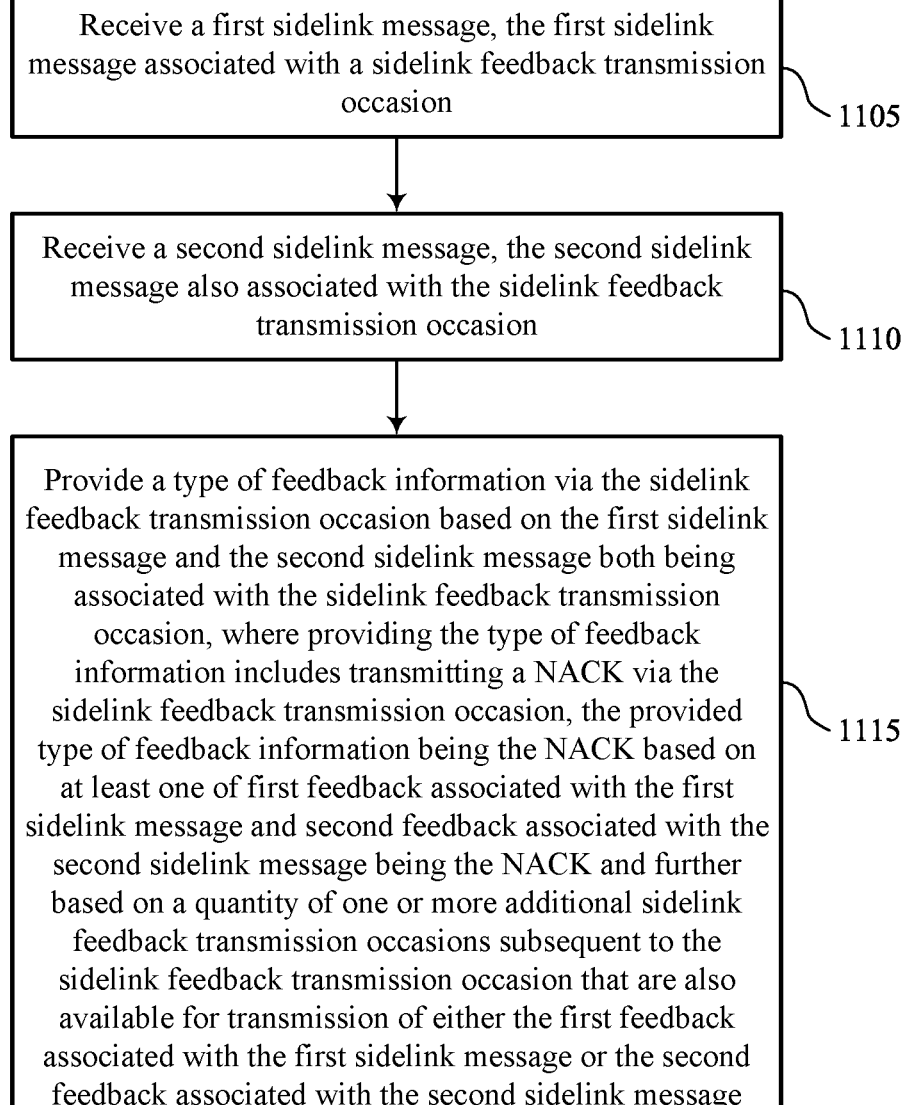

Receive a first sidelink message, the first sidelink message associated with a sidelink feedback transmission occasion

1105

Receive a second sidelink message, the second sidelink message also associated with the sidelink feedback transmission occasion

1110

Provide a type of feedback information via the sidelink feedback transmission occasion based on the first sidelink message and the second sidelink message both being associated with the sidelink feedback transmission occasion, where providing the type of feedback information includes transmitting a NACK via the sidelink feedback transmission occasion, the provided type of feedback information being the NACK based on at least one of first feedback associated with the first sidelink message and second feedback associated with the second sidelink message being the NACK and further based on a quantity of one or more additional sidelink feedback transmission occasions subsequent to the sidelink feedback transmission occasion that are also available for transmission of either the first feedback associated with the first sidelink message or the second feedback associated with the second sidelink message

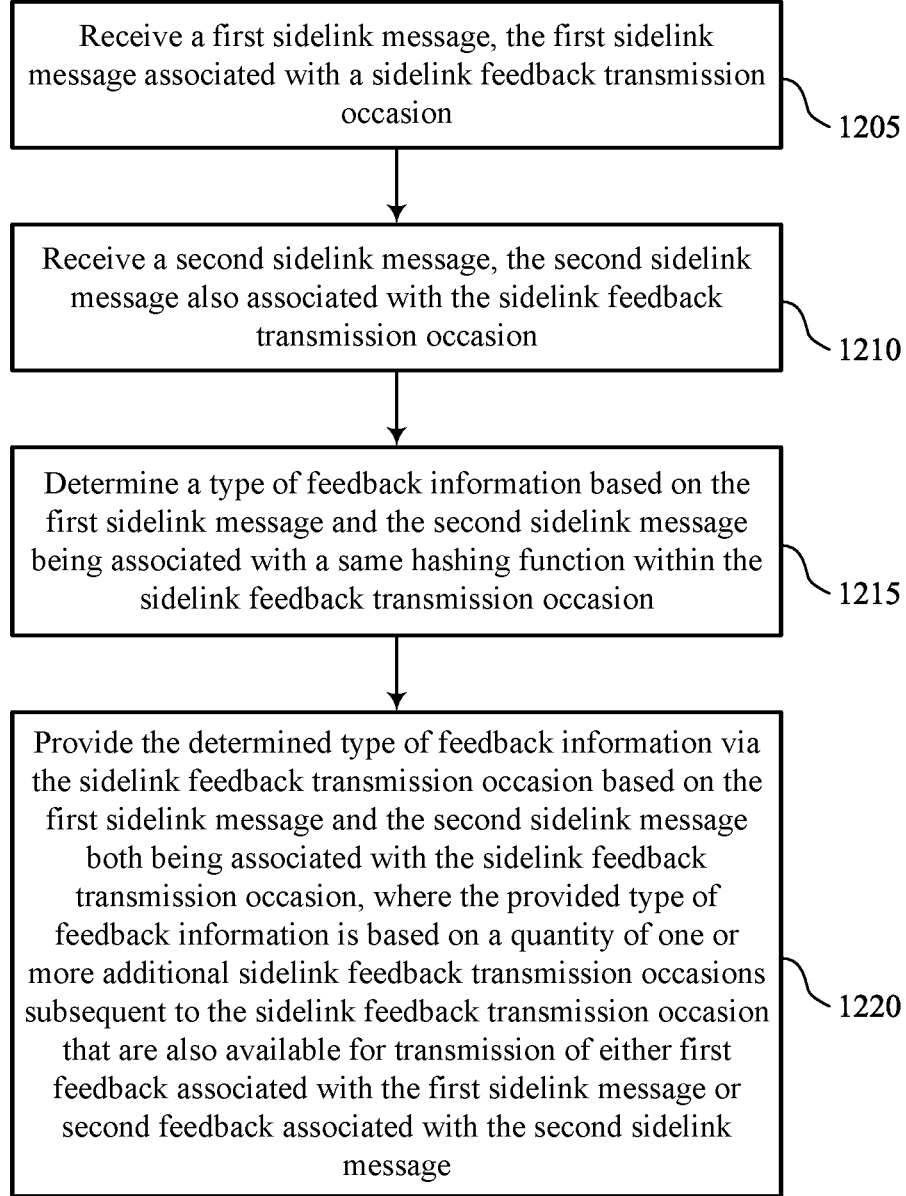

Receive a first sidelink message, the first sidelink message associated with a sidelink feedback transmission occasion

1205

Receive a second sidelink message, the second sidelink message also associated with the sidelink feedback transmission occasion

1210

Determine a type of feedback information based on the first sidelink message and the second sidelink message being associated with a same hashing function within the sidelink feedback transmission occasion

1215

Provide the determined type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message

HANDLING RESOURCE COLLISIONS BASED ON SIDELINK FEEDBACK TRANSMISSION OPPORTUNITIES

FIELD OF TECHNOLOGY

The following relates to wireless communication, including handling resource collisions based on sidelink feedback transmission opportunities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a sidelink UE may receive a sidelink message from one or more other sidelink UEs. The sidelink UE may transmit feedback in response to each sidelink message to indicate whether the respective sidelink message was received and decoded properly. The UE may perform a listen-before-talk (LBT) procedure to gain access to a sidelink feedback channel before transmitting the feedback.

SUMMARY

The described techniques relate to improved methods, systems, devices, and apparatuses that support handling resource collisions based on sidelink feedback transmission opportunities. For example, the described techniques provide for a sidelink user equipment (UE) to identify when a potential collision between feedback for two or more sidelink messages may occur and determine a type of feedback information to provide via the colliding feedback transmission occasion (e.g., for the sidelink UE to determine what type of feedback to provide via a feedback occasion when the UE is scheduled or otherwise has the ability to transmit feedback responsive to more than one message, such as from different UEs, in the same feedback occasion-such as when the same feedback occasion is available to the UE for the transmission of multiple feedback messages corresponding to multiple messages received by the sidelink UE).

For example, the UE may receive at least a first sidelink message and a second sidelink message associated with a same sidelink feedback transmission occasion. First feedback for the first sidelink message and second feedback for the second sidelink message may be associated with at least partially overlapping time and/or frequency resources within the sidelink feedback transmission occasion, or with a same hashing function within the sidelink feedback transmission occasion, or both, which may correspond to a potential collision between the first and second feedback if transmitted in the sidelink feedback transmission occasion. The UE as described herein may provide a type of feedback information in place of the first and second feedback via the sidelink feedback transmission occasion. The type of feedback information may be one of a positive acknowledgment (ACK), a negative acknowledgment (NACK), or a discontinuous transmission (DTX).

In some cases, the UE may determine the type of feedback information to provide based on a type of the first feedback and a type of the second feedback (e.g., whether the first and/or second feedback include an ACK, a NACK, or both), based on a quantity of additional feedback transmission occasions after the feedback transmission occasion that are available for transmission of either the first feedback or the second feedback, or any combination thereof. By determining the type of feedback information to provide in accordance with the techniques described herein, the UE may improve coordination between sidelink devices, reduce a likelihood of collisions or interference between feedback transmissions, and minimize or reduce a quantity of retransmissions, which may reduce latency, among other examples.

A method for wireless communication by a UE is described. The method may include receiving a first sidelink message, the first sidelink message associated with a sidelink feedback transmission occasion, receiving a second sidelink message, the second sidelink message also associated with the sidelink feedback transmission occasion, and providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

A UE for wireless communication is described. The UE may include one or more memories storing processor executable code, and one or more processors coupled with the one or more memories. The one or more processors may individually or collectively operable to execute the code to cause the UE to receive a first sidelink message, the first sidelink message associated with a sidelink feedback transmission occasion, receive a second sidelink message, the second sidelink message also associated with the sidelink feedback transmission occasion, and provide a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

Another UE for wireless communication is described. The UE may include means for receiving a first sidelink message, the first sidelink message associated with a sidelink feedback transmission occasion, means for receiving a second sidelink message, the second sidelink message also associated with the sidelink feedback transmission occasion, and means for providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

A non-transitory computer-readable medium storing code for wireless communication is described. The code may include instructions executable by a processor to receive a first sidelink message, the first sidelink message associated with a sidelink feedback transmission occasion, receive a second sidelink message, the second sidelink message also associated with the sidelink feedback transmission occasion, and provide a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

In some examples of the method, UEs, and non-transitory computer-readable medium described herein, providing the type of feedback information may include operations, features, means, or instructions for performing DTX during the sidelink feedback transmission occasion, where the provided type of feedback information includes a DTX type based on the first feedback including a positive ACK and the second feedback including a NACK and further based on at least one of the one or more additional sidelink feedback transmission occasions being available for transmission of the second feedback including the NACK.

Some examples of the method, UEs, and non-transitory computer-readable medium described herein may further include operations, features, means, or instructions for transmitting the second feedback including the NACK via the at least one additional sidelink feedback transmission occasion based on performing the DTX during the sidelink feedback transmission occasion.

In some examples of the method, UEs, and non-transitory computer-readable medium described herein, the first feedback and the second feedback both include unicast or groupcast feedback of a first type or a second type, the first type associated with indication of positive ACKs via DTX and the second type associated with indication of positive ACKs via transmission of positive ACKs.

In some examples of the method, UEs, and non-transitory computer-readable medium described herein, the first feedback includes unicast feedback or groupcast feedback of a second type, the second type associated with indication of positive ACKs via transmission of positive ACKs and the second feedback includes groupcast feedback of a first type, the first type associated with indication of positive ACKs via DTX.

In some examples of the method, UEs, and non-transitory computer-readable medium described herein, the first feedback includes groupcast feedback of a first type, the first type associated with indication of positive ACKs via DTX and the second feedback includes unicast feedback or groupcast feedback of a second type, the second type associated with indication of positive ACKs via transmission of positive ACKs.

In some examples of the method, UEs, and non-transitory computer-readable medium described herein, providing the type of feedback information may include operations, features, means, or instructions for transmitting a NACK via the sidelink feedback transmission occasion, where the provided type of feedback information includes the NACK based on at least one of the first feedback and the second feedback including the NACK.

Some examples of the method, UEs, and non-transitory computer-readable medium described herein may further include operations, features, means, or instructions for receiving a retransmission of the first sidelink message and the second sidelink message based on transmitting the NACK.

In some examples of the method, UEs, and non-transitory computer-readable medium described herein, the first feedback includes groupcast feedback of a first type, the first type associated with indication of positive ACKs via DTX and the second feedback includes unicast feedback or groupcast feedback of a second type, the second type associated with indication of positive ACKs via transmission of positive ACKs.

In some examples of the method, UEs, and non-transitory computer-readable medium described herein, the second feedback includes the NACK and transmitting the NACK may be further based on the quantity of one or more additional sidelink feedback transmission occasions that may be subsequent to the sidelink feedback transmission occasion and that may be available for transmission of the second feedback being zero.

In some examples of the method, UEs, and non-transitory computer-readable medium described herein, the first feedback and the second feedback both include unicast or groupcast feedback of a first type or a second type, the first type associated with indication of positive ACKs via DTX and the second type associated with indication of positive ACKs via transmission of positive ACKs.

In some examples of the method, UEs, and non-transitory computer-readable medium described herein, providing the type of feedback information may include operations, features, means, or instructions for performing DTX during the sidelink feedback transmission occasion, where the provided type of feedback information includes a DTX type based on both the first feedback and the second feedback including positive feedback of a feedback type that may be associated with indication of positive ACKs via DTX.

In some examples of the method, UEs, and non-transitory computer-readable medium described herein, providing the type of feedback information may include operations, features, means, or instructions for transmitting a NACK via the sidelink feedback transmission occasion, where the provided type of feedback information includes the NACK based on both the first feedback and the second feedback including the NACK.

In some examples of the method, UEs, and non-transitory computer-readable medium described herein, the first feedback includes groupcast feedback of a first type, the first type associated with indication of positive ACKs via DTX and the second feedback includes unicast feedback or groupcast feedback of a second type, the second type associated with indication of positive ACKs via transmission of positive ACKs.

In some examples of the method, UEs, and non-transitory computer-readable medium described herein, providing the type of feedback information may include operations, features, means, or instructions for transmitting a positive ACK via the sidelink feedback transmission occasion, where the provided type of feedback information includes the positive ACK based on both the first feedback and the second feedback including the positive ACK.

In some examples of the method, UEs, and non-transitory computer-readable medium described herein, the first feedback includes groupcast feedback of a first type, the first type associated with indication of positive ACKs via DTX and the second feedback includes unicast feedback or groupcast feedback of a second type, the second type associated with indication of positive ACKs via transmission of positive ACKs.

Some examples of the method, UEs, and non-transitory computer-readable medium described herein may further include operations, features, means, or instructions for determining the type of feedback information based on the first sidelink message and the second sidelink message being associated with a same hashing function within the sidelink feedback transmission occasion.

Some examples of the method, UEs, and non-transitory computer-readable medium described herein may further include operations, features, means, or instructions for determining the type of feedback information based on a first set of one or more sidelink feedback resources associated with the first sidelink message at least partially overlapping in time, frequency, or both, with a second set of one or more sidelink feedback resources associated with the second sidelink message within the sidelink feedback transmission occasion.

In some examples of the method, UEs, and non-transitory computer-readable medium described herein, the provided type of feedback information includes one of a positive ACK, a NACK, or a DTX type.

6

Figure 1:
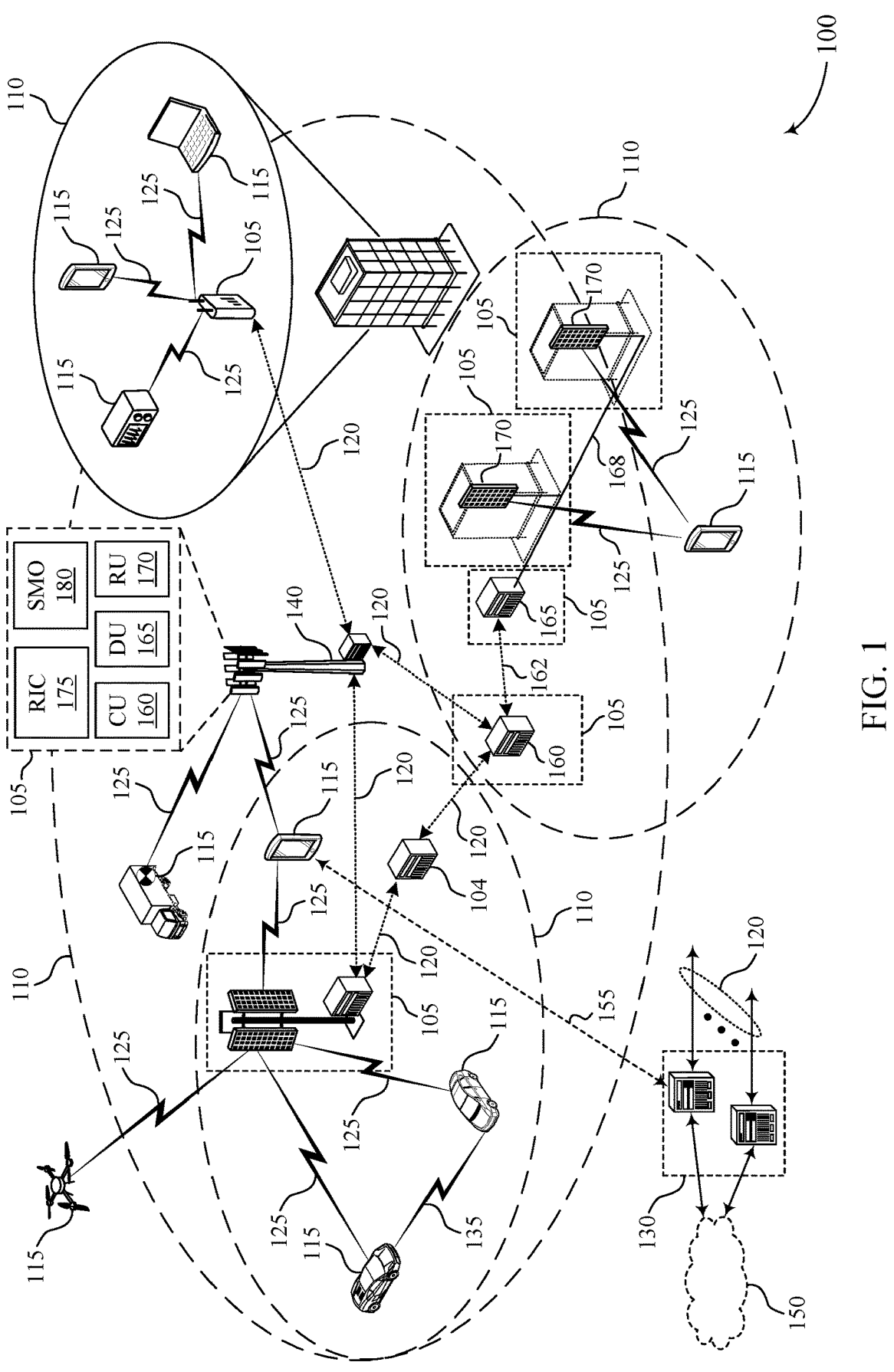
FIG. 1 shows an example of a wireless communications system that supports handling resource collisions based on sidelink feedback transmission opportunities in accordance with one or more aspects of the present disclosure.

FIGS. 9 through 12 show flowcharts illustrating methods that support handling resource collisions based on sidelink feedback transmission opportunities in accordance with one or more aspects of the present disclosure.

DETAILED DESCRIPTION

In some wireless communications systems, a sidelink user equipment (UE) may transmit feedback in response to one or more sidelink messages received from one or more other sidelink UEs. The UE may transmit the feedback via a transmission occasion that includes time and frequency resources associated with a respective sidelink message. In some examples, the UE may perform listen-before-talk (LBT) to gain access to a sidelink channel before transmitting the feedback. Multiple transmission occasions for sidelink feedback may be configured at different times, frequencies, or using different hashing functions to account for LBT uncertainty. However, in some cases, a UE may have two or more feedback messages available for transmission in a same transmission occasion. For example, the UE may be communicating with two or more other UEs via sidelink, and the other UEs may be associated with respective sets of sidelink feedback resources that the UE may use to transmit feedback messages to those other UEs (e.g., respective sets of PSFCH resources).

In some cases, however, the sidelink feedback resources available for the UE to transmit different sidelink feedback messages to different UEs may be within a same feedback transmission occasion, and hence the resources may collide (e.g., may be at least partially overlapping in time and/or frequency, or additionally may be associated with a same hashing function). Herein, such resources may be described as colliding, and correspondingly, feedback messages associated with colliding resources may also be described as colliding. For example, even if no over-the-air collision occurs between two or more sidelink feedback messages (e.g., because, through the techniques described herein, the messages are not transmitted over the air in colliding fashion), the sidelink feedback messages may nevertheless be considered and described as colliding due to being associated with colliding transmission resources (e.g., due to colliding transmission resources being available for transmission of the sidelink feedback messages).

Techniques, systems, and devices described herein provide for a sidelink UE to determine a type of feedback to provide via a feedback transmission occasion when the transmission occasion is available to convey feedback for two or more different sidelink messages that may collide (e.g., for which available transmission resources may collide) within the transmission occasion. The feedback type may include a positive acknowledgment (ACK), a negative acknowledgment (NACK), or discontinuous transmission (DTX) (e.g., an absence of a feedback transmission during the transmission occasion). The UE may determine which type of feedback to provide via the transmission occasion based on the types of feedback that are to be sent via the transmission occasion and based on a quantity of additional sidelink feedback transmission occasions that are available for transmissions of any feedback that includes a NACK.

For example, in some cases, if the colliding feedback transmissions include at least one ACK and at least one NACK, the UE may determine to perform DTX in the transmission occasion if there is at least one subsequent transmission occasion available for transmission of the NACK, otherwise the UE may transmit a NACK in the transmission occasion. Additionally, or alternatively, the UE may perform unicast and/or groupcast sidelink feedback of a first type associated with indication of ACKs via DTX or of a second type associated with indication of ACKs by transmitting an ACK, and the UE may account for such types when determining a type of feedback to provide in the transmission occasion. The UE may thereby account for feedback types as well as additional available sidelink feedback transmission occasions when determining a type of feedback to provide during a single feedback occasion that is associated with multiple sidelink messages, which may reduce interference and improve coordination between devices, among other possibilities.

Aspects of the disclosure are initially described in the context of wireless communications systems. Additional aspects of the disclosure are described with reference to feedback timeline configurations and a process flow. Aspects of the disclosure are further illustrated by and described with reference to apparatus diagrams, system diagrams, and flowcharts that relate to handling resource collisions based on sidelink feedback transmission opportunities.

FIG. 1 shows an example of a wireless communications system 100 that supports handling resource collisions based on sidelink feedback transmission opportunities in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support handling resource collisions based on sidelink feedback transmission opportunities as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300

GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some systems, a sidelink UE 115 may receive a transmission from another sidelink UE 115 (e.g., via a physical sidelink shared channel (PSSCH)). The sidelink UE 115 may transmit feedback via a physical sidelink feedback channel (PSFCH) that indicates whether the transmission was received and decoded properly or not. Before transmitting the feedback, the sidelink UE 115 may perform an LBT procedure to gain access to the PSFCH for transmitting the feedback. The LBT procedure may introduce some ambiguity, in some examples. For example, a time at which the LBT procedure ends may vary, and the UE 115 may perform one or more LBT procedures if a first LBT attempt fails. To address the LBT uncertainty of sidelink feedback, one or more PSFCH opportunities may be configured for a given PSSCH transmission with different feedback timelines (e.g., HARQ timelines). There may be multiple PSFCH resource sets (e.g., multiplexed in time and/or frequency), where each timeline is associated with a respective PSFCH resource set, as described in further detail elsewhere herein, including with reference to FIGS. 3A and 3B. Additionally, or alternatively, the UE 115 may use differently hashed resources over a common or shared PSFCH resource set for each timeline, as described in further details elsewhere herein, including with reference to FIG. 3C.

In some examples, to reduce a quantity of times a UE 115 may drop a PSFCH transmission due to LBT failure, the wireless communication system 100 may support more than one PSFCH occasion per sidelink transmission (e.g., PSSCH or physical sidelink control channel (PSCCH) transmission). Such additional PSFCH occasion(s) may be configured for communications by a UE 115 (e.g., pre-configured or defined), may be dynamically indicated to the UE 115 via control signaling, or both.

A collision between two or more sidelink feedback messages may occur if a single transmission occasion (e.g., PSFCH occasion) is available for two or more feedback messages, and the feedback messages overlap in time and/or frequency or additionally if the feedback messages utilize a same hashing function. That is, a collision as described herein may correspond to a feedback message being transmitted in resources that at least partially overlap with resources for a different feedback message or may correspond to two feedback messages transmitted in a same transmission occasion of a PSFCH resource set using a same hashing function. In some examples, a single UE 115 may have two or more feedback messages to transmit, and the feedback messages may collide within a transmission occasion.

Techniques, systems, and devices described herein provide for a sidelink UE 115 to determine a type of feedback to provide via a PSFCH occasion in which two or more feedback messages may potentially collide. As described herein, the UE 115 may determine the type of feedback to provide based on the type of feedback in each of the two or more colliding feedback messages and based on a quantity of additional PSFCH occasions subsequent to the PSFCH occasion via which the UE 115 is to transmit that are also available for (e.g., allocated for or scheduled for) transmission of feedback associated with one or more of the feedback messages.

Figure 2:
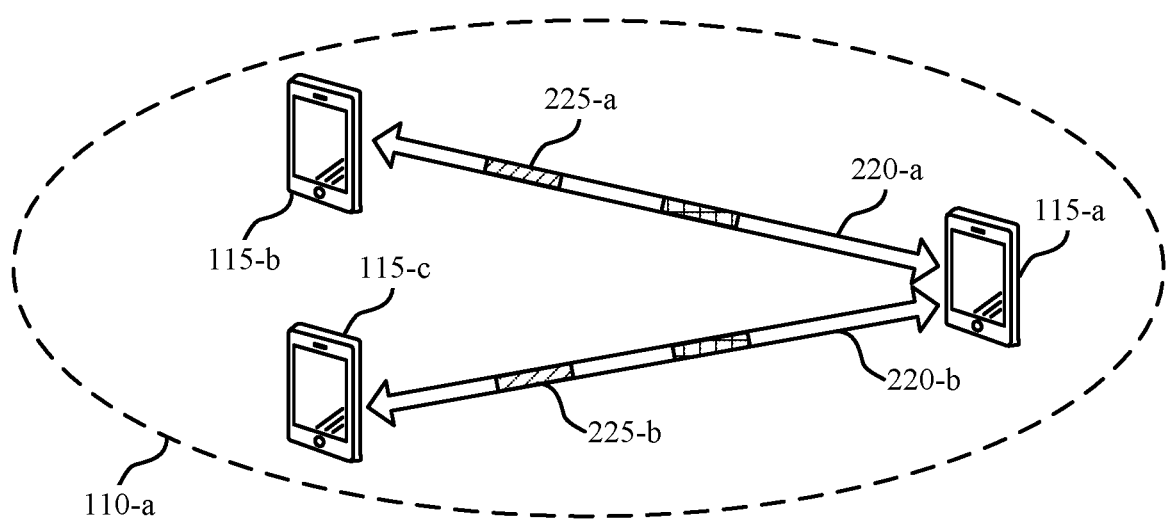
FIG. 2 shows an example of a wireless communications system that supports handling resource collisions based on sidelink feedback transmission opportunities in accordance with one or more aspects of the present disclosure.
Figure 2:
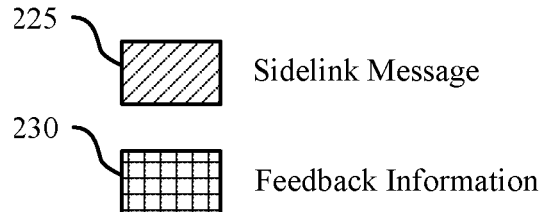

FIG. 2 shows an example of a wireless communications system 200 that supports handling resource collisions based on sidelink feedback transmission opportunities in accordance with one or more aspects of the present disclosure. The wireless communications system 200 may implement or be implemented by aspects of the wireless communications system 100. For example, the wireless communications system 200 includes a UE 115-a, a UE 115-b, and a UE 115-c, which may represent examples of UEs 115 as described with reference to FIG. 1. The UEs 115 may communicate with each other within the geographic coverage area 110-a and via respective sidelink communication links 220. For example, the UE 115-a may communicate with the UE 115-b via the sidelink communication link 220-a and the UE 115-a may communicate with the UE 115-c via the sidelink communication link 220-b. Although not illustrated in FIG. 2, it is to be understood that, in some examples, the UEs 115 may be in communication with one or more other devices, such as another UE 115, a network entity 105, or some other type of device.

The UEs 115-*a*, 115-*b*, and 115-*c* may exchange one or more sidelink messages 225. A sidelink message 225 may represent an example of a data transmission via a PSSCH, a control message transmitted via a PSCCH (e.g., sidelink control information (SCI)), some other type of message or information conveyed via a sidelink communication link 220, or any combination thereof. In this example, the UE 115-*b* may transmit a sidelink message 225 to the UE 115-*a* via the sidelink communication link 220-*a* and the UE 115-*c* may transmit a sidelink message 225 to the UE 115-*a* via the sidelink communication link 220-*b*.

Each sidelink message 225 may be associated with (e.g., mapped to) at least one respective sidelink feedback transmission occasion, which may include a set of one or more sidelink resources available for transmission of feedback in response to the sidelink message 225. The association between the sidelink message 225 and a transmission occasion may be indicated via SCI or some other type of control signaling, or may be configured (e.g., via a resource pool configuration or some other configuration). After receiving a sidelink message 225, the UE 115-*a* may perform an LBT procedure to access a sidelink feedback channel for transmitting during the corresponding feedback transmission occasion. In some examples, the LBT may fail one or more times and the UE 115-*a* may be unable to access the channel during the transmission occasion. In such cases, the UE 115-*a* may drop the feedback.

To reduce PSFCH transmission dropping due to LBT failure, more than one sidelink feedback transmission occasion may be provided per sidelink message 225. For example, multiple PSFCH resource sets may be configured, and each resource set may be associated with a respective feedback timeline. The PSFCH resource sets may be multiplexed in time and/or frequency, as described in further detail elsewhere herein, including with reference to FIGS. 3A and 3B. Additionally, or alternatively, a single PSFCH resource pool may be configured and shared by multiple different feedback timelines, each associated with a respective hashing function, a described in further detail elsewhere herein, including with reference to FIG. 3C.

In some cases, however, collisions between sidelink feedback transmissions may still occur within a transmission occasion. For example, the sidelink message 225-*a* may be associated with a first feedback transmission occasion, and the sidelink message 225-*b* may be associated with the same transmission occasion, where feedback information 230 for both sidelink messages 225-*a* and 225-*b* may be at least partially overlapping in time and frequency, or may be associated with a same hashing function. Additionally, or alternatively, the sidelink messages 225-*a* and 225-*b* may be associated with different transmission occasions, but the UE 115-*a* may fail LBT or may otherwise be unable to transmit during a first feedback transmission occasion for the sidelink message 225-*a*. In such cases, a feedback transmission occasion during a second or third timeline for the sidelink message 225-*a* may collide with feedback information 230 for the sidelink message 225-*b*, or vice versa.

Techniques, systems, and devices described herein provide for the UE 115-*a* to determine a type of feedback information 230 to transmit in a feedback transmission occasion if there is a potential collision between two or more sets of feedback information 230 in the transmission occasion. That is, techniques for determining what to transmit in a feedback transmission occasion when feedback transmissions collide are described herein. The type of feedback information 230 may be one of an ACK, a NACK, or DTX (e.g., null information or an absence of transmission by the UE 115 during the transmission occasion). The type of feedback information 230 that the UE 115-*a* provides in the transmission occasion may be based on a quantity of subsequent transmission occasions available for transmission of the feedback, a type of feedback for each of the sidelink messages 225, a sidelink feedback mode, or any combination thereof.

The UEs 115 described herein may support two or more different sidelink feedback modes, which may also be referred to as options or schemes herein. A first sidelink feedback mode may be associated with indication of a positive ACK via DTX. That is, in the first sidelink feedback mode, a UE 115 may transmit a NACK to indicate a failure to receive or decode a sidelink message 225, and the UE 115 may perform DTX to indicate a success. A second sidelink feedback mode may be associated with an indication of a positive ACK via transmission of an ACK. That is, in the second sidelink feedback mode, a UE 115 may transmit a NACK to indicate a failure to receive or decode a sidelink message 225, and the UE 115 may transmit an ACK to indicate a success. The first sidelink feedback mode, the second sidelink feedback mode, or both may support groupcast or unicast sidelink communications. In some examples, the sidelink feedback mode may be configured or set per sidelink message 225 or per sidelink communication link 220. For example, the sidelink message 225-*a* and the sidelink message 225-*b* may be associated with the same or different sidelink feedback modes.

If both of the sidelink messages 225-*a* and 225-*b* are associated with unicast and/or groupcast communications in the second sidelink feedback mode (e.g., unicast and/or groupcast option 2) and are associated with colliding sidelink feedback, the UE 115-*a* may determine a type of the feedback information 230 to provide via the transmission occasion in which the feedback for the sidelink messages 225-*a* and 225-*b* collide based on whether the collided links include an ACK or a NACK and based on a quantity of subsequent sidelink feedback transmission occasions that are available. In some examples, as shown in Table 1, the UE 115-*a* may transmit a NACK if any one of the multiple collided feedback messages is intended to carry a NACK. In such cases, a sidelink UE 115 that is supposed to receive an ACK may receive a NACK and may initiate a retransmission. For example, if either of the sidelink messages 225-*a* and 225-*b* are not received or decoded properly by the UE 115-*a*, the UE 115-*a* may transmit a NACK to both of the UEs 115-*b* and 115-*c* (e.g., as a broadcast message or separate unicast messages in the same transmission occasion). The UE 115-*a* may transmit an ACK if both of the sidelink messages 225-*a* and 225-*b* are received and decoded properly and may transmit a NACK if neither of the sidelink messages 225-*a* and 225-*b* are received or decoded properly.

TABLE 1

| First Example Feedback Information Types for Sidelink Mode 2 | | |
|---|---|---|
| Type of Feedback in First Sidelink Feedback Message | Type of Feedback in Second Sidelink Feedback Message | Type of Feedback Information Conveyed Via Transmission Occasion |
| ACK | NACK | NACK |
| NACK | ACK | NACK |
| ACK | ACK | ACK |
| NACK | NACK | NACK |

In some other examples, the UE 115-a may perform DTX when multiple collided links carry a mixture of ACK and NACK if there is at least one subsequent transmission occasion that is available for transmission of the NACK. For example, if the sidelink message 225-a is associated with a NACK and the sidelink message 225-b is associated with an ACK, the UE 115-a may determine whether there are any subsequent transmission occasions that are available for transmission of the NACK responsive to the sidelink message 225-a. If there are not any (e.g., zero) available transmission occasions for transmission of the NACK, the UE 115-a may transmit a NACK via the collided transmission occasion, as described with reference to Table 1. If there is at least one available transmission occasion for transmission of the NACK, the UE 115-a may perform DTX in the collided transmission occasion and may wait for a next PSFCH opportunity to transmit the NACK for the sidelink message 225-a, as shown in Table 2. In some examples, the UE 115-a may additionally transmit the ACK in a next available transmission occasion if there is not a collision. Additionally, or alternatively, the UE 115-a may refrain from transmitting the ACK, and the DTX in the collided transmission occasion may indicate the ACK.

In some examples, the next available transmission occasion may be associated with different time and/or frequency resources, or a different resource hashing for the multiple collided PSFCHs. As such, by waiting for the next transmission occasion, the UE 115-a may avoid the collision and transmit the NACK successfully without collision in the next transmission occasion. For example, the UE 115-a may select a PSFCH resource (e.g., a transmission occasion) based on a hashing function, such as $$(P_{ID} + M_{ID} + m) \bmod N^{(1)}_{PSFCH},$$

where $P_{ID}$ may be an identifier (ID) of a transmitting device, $M_{ID}$ may be an ID of a receiving device, m may be an opportunistic index, and $N_{PSFCH}$ may be a PSFCH resource index. If the two collided PSFCHs are from different m values, the next transmission occasion (e.g., PSFCH opportunity) may be hashed to different PSFCH resources.

TABLE 2

| Second Example Feedback Information Types for Sidelink Mode 2 or Mode 1 | | |
|---|---|---|
| Type of Feedback in First Sidelink Feedback Message | Type of Feedback in Second Sidelink Feedback Message | Type of Feedback Information Conveyed Via Transmission Occasion |
| ACK | NACK | If at Least One Additional Feedback Transmission Occasion is Available for the NACK, Perform DTX; else NACK |
| NACK | ACK | If at Least One Additional Feedback Transmission Occasion is Available for the NACK, Perform DTX; else NACK |
| ACK | ACK | ACK for Feedback Mode 2 or DTX for Feedback Mode 1 |
| NACK | NACK | NACK |

If both of the sidelink messages 225-a and 225-b are associated with groupcast communications in the first sidelink feedback mode (e.g., groupcast option 1) and are associated with colliding sidelink feedback, the UE 115-a may determine a type of feedback information 230 to provide via the transmission occasion in which the feedback for the sidelink messages 225-a and 225-b is to be transmitted based on whether the collided links include an ACK or a NACK and based on a quantity of subsequent sidelink feedback transmission occasions that are available, as shown in Table 2. For example, as shown in Table 2, if one of the links is associated with an ACK and the other link is associated with a NACK, the UE 115-a may perform DTX if there is at least one subsequent transmission occasion that is available for transmission of the NACK. If there is not an available transmission occasion for transmission of the NACK, the UE 115-a may transmit a NACK via the collided transmission occasion. If all of the collided links are NACKs, the UE 115-a may transmit a NACK. If all of the collided links are an ACK, the UE 115-a may perform DTX in the transmission occasion based on the sidelink feedback mode 1.

In some examples, one of the sidelink communication links 220 may be associated with the first sidelink feedback mode and the other sidelink communication link 220 may be associated with the second sidelink feedback mode. For example, the sidelink message 225-a conveyed via the sidelink communication link 220-a may be associated with feedback in accordance with the first sidelink feedback mode and the sidelink message 225-b conveyed via the sidelink communication link 220-b may be associated with feedback in accordance with the second sidelink feedback mode, or vice versa. In such cases (e.g., if the collided links support different feedback modes), it may not be beneficial for the UE 115-a to transmit a NACK in response to both sidelink messages 225 because one of the collided feedback messages is associated with the second sidelink feedback mode (e.g., unicast or groupcast option 2) and conveys a NACK if the other of the collided feedback messages is associated with the first sidelink feedback mode (e.g., groupcast option 1) and conveys an ACK. For example, for groupcast communications in the first sidelink feedback mode, a UE 115 receiving feedback, such as the UE 115-b, may be configured to wait for (e.g., look through) most or all possible feedback transmission opportunities before determining that a groupcast transmission is an ACK or a NACK. That is, the UE 115-*b* may not perform a retransmission until after all of the feedback transmission opportunities.

As such, if one of the collided sidelink feedback messages is associated with the first sidelink feedback mode (e.g., groupcast option 1), the UE 115-*a* may determine a type of feedback information 230 to provide via the transmission occasion based on whether the collided links convey an ACK or a NACK, based on a type of feedback mode associated with the collided links, and based on a quantity of subsequent feedback transmission occasions that are available. For example, if a first sidelink message 225-*a* is associated with groupcast communications according to the first sidelink feedback mode (e.g., if the communication link 220-*a* is a groupcast option 1 link) and is associated with an ACK, and the second sidelink message 225-*b* is associated with unicast or groupcast feedback according to the second sidelink feedback mode (e.g., if the communication link 220-*b* is a unicast or groupcast option 2 link), and is associated with a NACK, the UE 115-*a* may perform DTX in the feedback transmission occasion. If both links (e.g., groupcast option 1 link and groupcast or unicast option 2 link) convey an ACK, the UE 115-*a* may transmit an ACK. If both links (e.g., groupcast option 1 link and groupcast or unicast option 2 link) convey a NACK, the UE 115-*a* may transmit a NACK.

If a first sidelink message 225-*a* is associated with groupcast communications according to the first sidelink feedback mode (e.g., if the communication link 220-*a* is a groupcast option 1 link) and is associated with a NACK, and the second sidelink message 225-*b* is associated with unicast or groupcast feedback according to the second sidelink feedback mode (e.g., if the communication link 220-*b* is a unicast or groupcast option 2 link), and is associated with an ACK, the UE 115-*a* may determine whether to transmit a NACK or perform DTX. In some examples, the UE 115-*a* may transmit a NACK to both of the UEs 115-*b* and 115-*c* in the transmission occasion based on the first link being associated with a NACK and the second link being associated with an ACK. Additionally, or alternatively, the UE 115-*a* may determine a quantity of subsequent transmission occasions that are available for transmission of the NACK associated with the first sidelink feedback mode. If there is at least one remaining transmission occasion available for transmission of the NACK, the UE 115-*a* may perform DTX in the colliding transmission occasion. The UE 115-*a* may attempt to transmit the NACK in the next transmission occasion (e.g., PSFCH opportunity) using different hashing or non-colliding resources in the next transmission occasion. If there are no remaining transmission occasions available for transmission of the NACK, the UE 115-*a* may transmit a NACK via the transmission occasion. Types of feedback information 230 provided by the UE 115-*a* via the transmission occasion when two feedback messages associated with different feedback modes collide in the transmission occasion are shown in Table 3.

TABLE 3

Example Feedback Information Types for Colliding Feedback Associated With Different Feedback Modes

| Type of Feedback in First Sidelink Feedback Message Associated With First Sidelink Feedback Mode | Type of Feedback in Second Sidelink Feedback Message Associated With Second Sidelink Feedback Mode | Type of Feedback Information Conveyed Via Transmission Occasion |
| --- | --- | --- |
| ACK | NACK | DTX |
| NACK | ACK | If at Least One Additional Feedback Transmission Occasion is Available for the NACK, Perform DTX; else NACK |
| ACK | ACK | ACK |
| NACK | NACK | NACK |

A UE 115 as described herein may thereby follow a set of rules or protocols (e.g., based on a configuration at the UE 115 or a configuration indicated via control signaling) to determine a type of feedback information 230 to provide via a transmission occasion when sidelink feedback for two or more sidelink messages 225 may potentially collide in the transmission occasion. The UE 115 may determine the type of feedback information 230 based on a type of feedback for each sidelink message 225, a quantity of subsequent PSFCH opportunities that are available, a type or mode of sidelink feedback, or any combination thereof. The protocols for determining the type of feedback information to provide may be configured at the UE 115 or indicated via control signaling (e.g., RRC signaling, SCI, or some other type of control signaling).

The UE 115 may provide the determined type of feedback as a groupcast/broadcast message to multiple UEs 115 in response to the two or more sidelink messages 225, and the UEs 115 may determine whether to perform a retransmission or not based on the feedback. By accounting for various parameters when determining the type of feedback information 230, the UE 115 may improve communication reliability, coordination between devices, and reduce overhead and latency by reducing a quantity of retransmissions. Example timelines in which such collisions between sidelink feedback may occur are illustrated and described in further detail elsewhere herein, including with reference to FIGS. 3A-3C.

Figures 3A, 3B, 3C:
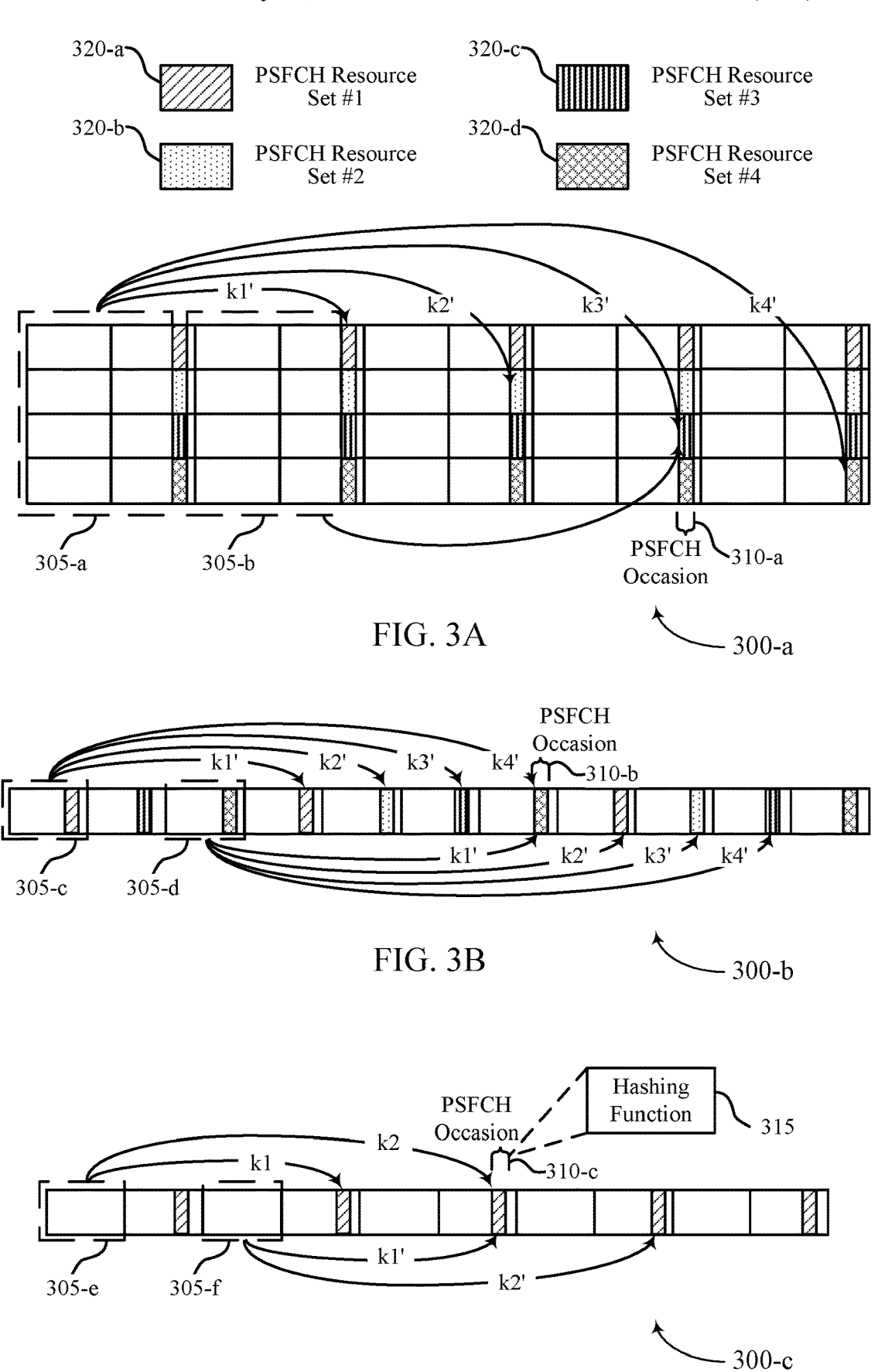
FIGS. 3A-3C show examples of feedback timeline configurations that support handling resource collisions based on sidelink feedback transmission opportunities in accordance with one or more aspects of the present disclosure.

FIGS. 3A-3C show examples of feedback timeline configurations 300 that support handling resource collisions based on sidelink feedback transmission opportunities in accordance with one or more aspects of the present disclosure. The feedback timeline configurations 300-*a*, 300-*b*, and 300-*c* may implement or be implemented by aspects of the wireless communications systems 100 and 200. For example, the feedback timeline configurations 300-*a*, 300-*b*, and 300-*c*, illustrate example time and frequency resources allocated for transmission of sidelink feedback by a sidelink UE, which may represent an example of a UE 115 as described with reference to FIGS. 1 and 2. In some examples, the UE may transmit feedback for two or more sidelink messages via a same feedback transmission occasion, and the feedback may collide due to overlapping resources, a same hashing function, or both. In this example, the UE may determine a type of feedback to transmit via the colliding transmission occasion based on the types of the colliding feedback and a quantity of additional sidelink feedback transmission occasions.

The UE may receive a sidelink message 305 via one or more PSSCH resources. The sidelink message 305 may be associated with one or more feedback transmission occasions. For example, SCI that schedules the sidelink message 305 may also indicate time and frequency resources for feedback responsive to the sidelink message. The UE may perform LBT to gain access to the sidelink feedback channel before transmitting feedback. In some examples, the UE may fail LBT one or more times before gaining access to the channel. To account for LBT uncertainty, a sidelink message 305 may be configured with multiple PSFCH opportunities associated with different feedback timelines (e.g., HARQ timelines k1', k2', k3', and k4'). Each feedback timeline may be associated with a different resource set (e.g., resource sets multiplexed in time and/or frequency). Additionally, or alternatively, there may be a single resource set, and the UE may use differently hashed resources over the common resource set for each HARQ timeline. The multiple PSFCH occasions may be configured (e.g., defined or pre-configured, such as via RRC signaling) or configured and dynamically indicated via control signaling (e.g., via SCI transmitted by a UE that transmits a sidelink data message).

FIG. 3A illustrates a first example feedback timeline configuration 300-a. In this example, the UE may be configured with multiple different resource sets, including the PSFCH resource sets 320-a through 320-d, that are multiplexed in frequency (e.g., multiple FDM PSFCH resource sets 320 configured for different timelines). For example, each PSFCH occasion 310, which may be referred to as a feedback transmission occasion herein, may include multiple frequency ranges associated with each PSFCH resource set 320. Frequency resources in each frequency range of the PSFCH occasion 310 may be associated with a respective resource set. That is, the PSFCH resource sets 320 may occupy different frequency resources in a same slot.

The UE may be configured (e.g., pre-configured or indicated via signaling) with multiple HARQ timelines k1'-k4' for transmitting feedback responsive to the sidelink message 305-a, such that if the UE performs LBT and fails the LBT, the UE may be able to retry LBT and transmit feedback in a next PSFCH occasion 310 associated with the next feedback timeline. The UE may continue to retry LBT and transmit in a next feedback timeline until the UE is successfully able to complete LBT or for a threshold quantity of retries. In this example, each HARQ timeline may be associated with a respective time and a respective PSFCH resource set 320. For example, the HARQ timeline k1' may be associated with a first PSFCH occasion 310 after the sidelink message 305-a and the first PSFCH resource set 320-a. If the UE succeeds LBT on the first try, the UE may transmit feedback via resources in the first PSFCH resource set 320-a in the first PSFCH occasion 310 according to the timeline k1'. HARQ timeline k2' may be associated with a next PSFCH occasion 310 and the second PSFCH resource set 320-b. If the UE fails the first LBT attempt and succeeds during a second LBT attempt before the PSFCH occasion 310 associated with the k2' timeline, the UE may transmit feedback via the second PSFCH resource set 320-b. The HARQ timeline k3' may be associated with a next PSFCH occasion (e.g., PSFCH occasion 310-a) and the third PSFCH resource set 320-c. The HARQ timeline k4' may be associated with a final PSFCH occasion 310 and the fourth PSFCH resource set 320-d.

The UE may similarly be configured with one or more other HARQ timelines for each other sidelink message 305 the UE receives, including the sidelink message 305-b. In some examples, the feedback for two different sidelink message 305 may collide within a PSFCH occasion 310. For example, the UE may not pass LBT until the third try after receiving the sidelink message 305-a, such that the UE may transmit feedback for the sidelink message 305-a via the PSFCH occasion 310-a and the third PSFCH resource set 320-c according to the HARQ timeline k3'. The UE may pass LBT on a first try after receiving the sidelink message 305-b, and the first HARQ timeline for the sidelink message 305-b may also be associated with the PSFCH occasion 310-a and the third PSFCH resource set 320-c. In this example, the feedback for two different sidelink messages 305 may be at least partially overlapping in time and/or frequency within the PSFCH occasion 310-a, which may be associated with a potential collision if the UE does transmit the feedback.

FIG. 3B illustrates a second example feedback timeline configuration 300-b. In this example, the UE may be configured with multiple different resource sets, including the PSFCH resource sets 320-a through 320-d, that are multiplexed in time (e.g., multiple TDM PSFCH resource sets 320 for different HARQ timelines). For example, each PSFCH occasion 310 may include (e.g., be associated with) a respective PSFCH resource set 310. That is, each resource set 320 may occupy most or all frequency resources within a respective slot or some other transmission time interval (TTI).

The UE may be configured with multiple HARQ timelines k1'-k4' for transmitting feedback responsive to the sidelink message 305-c, such that if the UE performs LBT and fails the LBT, the UE may be able to retry LBT and transmit feedback in a next PSFCH occasion 310 associated with the next feedback timeline. The UE may continue to retry LBT and transmit in a next feedback timeline until the UE is successfully able to complete LBT or for a threshold quantity of retries. In this example, each HARQ timeline may be associated with a respective PSFCH resource set 320. For example, the HARQ timeline k1' may be associated with a first PSFCH occasion 310 after the sidelink message 305-c and the first PSFCH resource set 320-a. If the UE succeeds LBT on the first try, the UE may transmit feedback via resources in the first PSFCH resource set 320-a in the first PSFCH occasion 310 according to the timeline k1'. HARQ timeline k2' may be associated with a next PSFCH occasion 310 and the second PSFCH resource set 320-b. If the UE fails the first LBT attempt and succeeds during a second LBT attempt before the PSFCH occasion 310 associated with the k2' timeline, the UE may transmit feedback via the second PSFCH resource set 320-b. The HARQ timeline k3' may be associated with a next PSFCH occasion and the third PSFCH resource set 320-c. The HARQ timeline k4' may be associated with a final PSFCH occasion 310 (e.g., PSFCH occasion 310-b) and the fourth PSFCH resource set 320-d.

The UE may similarly be configured with one or more other HARQ timelines for each other sidelink message 305 the UE receives, including the sidelink message 305-d. In some examples, the feedback for two different sidelink message 305 may collide within a PSFCH occasion 310. For example, the UE may not pass LBT until the fourth try after receiving the sidelink message 305-c, such that the UE may transmit feedback for the sidelink message 305-c via the PSFCH occasion 310-b and the fourth PSFCH resource set 320-d according to the HARQ timeline k4'. The UE may pass LBT on a first try after receiving the sidelink message 305-d, and the first HARQ timeline for the sidelink message 305-d may also be associated with the PSFCH occasion 310-b and the fourth PSFCH resource set 320-d. In this example, the feedback for two different sidelink messages 305 may be at least partially overlapping in time and/or frequency within the PSFCH occasion 310-b, which may be associated with a potential collision if the UE does transmit the feedback.

FIG. 3C illustrates a third example feedback timeline configuration 300-c. In this example, the UE may be configured with a single PSFCH resource set 320-a. For example, each PSFCH occasion 310 may include (e.g., be associated with) the same shared (e.g., common) PSFCH resource set 320-a. The single PSFCH resource set 320-a may be shared by multiple timelines the UE may use differently hashed resources over the common PSFCH resource set 320-a based on which HARQ timeline is being used.

The hashing associated with each HARQ timeline may be based on a timeline index. For example, the hashing function may be equal to $$((P_{ID} + M_{ID} + m) \bmod N_{PSFCH}^{(1)}),$$

where $P_{ID}$ may be an ID of a transmitting device, $M_{ID}$ may be an ID of a receiving device, m may be a timeline index associated with the HARQ timeline, and $$N_{PSFCH}^{(1)}$$

may be an index of a PSFCH occasion.

In the example of FIG. 3C, the UE may be configured with multiple HARQ timelines k1 and k2 for transmitting feedback responsive to the sidelink message 305-e, such that if the UE performs LBT and fails the LBT, the UE may be able to retry LBT and transmit feedback in a next PSFCH occasion 310 associated with the next feedback timeline. The UE may continue to retry LBT and transmit in a next feedback timeline until the UE is successfully able to complete LBT or for a threshold quantity of retries. In this example, each HARQ timeline may be associated with a respective hashing function. For example, the HARQ timeline k1 may be associated with a first PSFCH occasion 310 after the sidelink message 305-e and a first hashing function (e.g., may include resources hashed according to the first hashing function). If the UE succeeds LBT on the first try, the UE may transmit feedback via resources in the first PSFCH resource set 320-a in the first PSFCH occasion 310 according to the timeline k1.

The HARQ timeline k2 may be associated with a next PSFCH occasion 310 (e.g., the PSFCH occasion 310-c) and a second hashing function (e.g., the hashing function 315). If the UE fails the first LBT attempt and succeeds during a second LBT attempt before the PSFCH occasion 310-c associated with the k2 timeline, the UE may transmit feedback via the PSFCH resource set 320-a and the PSFCH occasion 310-c using the hashing function 315.

The UE may similarly be configured with one or more other HARQ timelines for each other sidelink message 305 the UE receives, including the sidelink message 305-f. In some examples, the feedback for two different sidelink message 305 may collide within a PSFCH occasion 310. In some examples, if different PSFCH opportunities share a same PSFCH resource set 320-a, there may be an increased probability that different PSFCH opportunism for different sidelink may collide as compared with systems in which each PSFCH occasion 310 is associated with a different PSFCH resource set 320. For example, the UE may not pass LBT until the second try after receiving the sidelink message 305-e, such that the UE may transmit feedback for the sidelink message 305-e via the PSFCH occasion 310-c and using the hashing function 315 according to the HARQ timeline k2. The UE may pass LBT on a first try after receiving the sidelink message 305-f, and the first HARQ timeline k1' for the sidelink message 305-f may also be associated with the PSFCH occasion 310-c and the same hashing function 315. In this example, because the feedback for two different sidelink messages 305 is for transmission within the same PSFCH occasion 310-c using a same hashing function 315, the feedback may be associated with a potential collision if the UE does transmit the feedback. In other words, the UE may have two PSFCH transmissions in a same PSFCH resource toward two different sidelink UEs in a same PSFCH occasion, and the two PSFCH transmissions may potentially be from different PSFCH opportunities.

In some examples, the UE may communicate feedback using an interlaced PSFCH waveform. The interlaced PSFCH waveform may map PSSCH transmissions to PSFCH resources. For example, a PSSCH transmission (e.g., sidelink message) in a first interlace (e.g., interlace i) may be mapped to a PSFCH resource in the first interlace (e.g., interlace i). In some examples, there may be up to six cyclic shift pair resources within a single PSFCH interlace. If a PSFCH occasion periodicity (e.g., a periodicity at which PSFCH occasions occur) is configured to be greater than one slot (e.g., two or four slots), different slots, such as PSSCH slots or physical downlink shared channel (PDSCH) slots and different links may share the up to six cyclic shift pair resources within a single PSFCH interlace. As such, there may be a relatively small quantity of PSFCH resources within the interlaced waveform as compared with other types of waveforms. If a UE transmits feedback via such an interlaced waveform, there may be less room for the UE to apply a hashing function or perform hashing, which may reduce reliability of the hashing. For example, the UE may be more likely to use a same hashing function for two or more feedback messages within a same transmission occasion.

The UE may thereby identify that a potential collision may occur if feedback for two or more sidelink messages is to be transmitted in a same PSFCH occasion using a same hashing function or via at least partially overlapping resources, or both. If the UE transmits such feedback, the two or more UEs that are intended to receive the feedback may not know which feedback is for which UE, or the feedback messages may interfere with one another, or both. Techniques, systems, and devices described herein provide for the UE to determine a type of feedback information to transmit via the PSFCH occasion if the UE detects a potential collision. The UE may transmit the determined type of feedback information to all of the two or more intended receiving UEs. For example, in the sidelink feedback timeline configuration 300-c, the UE may transmit a single type of feedback information via the PSFCH occasion 310-c using the hashing function 315 (e.g., instead of transmitting two separate feedback messages that may collide). The UE may determine the type of feedback information to provide based on one or more parameters, including a type of each feedback that collides, a quantity of additional PSFCH occasions that are available for transmission of at least one of the feedback messages, one or more other parameters, or any combination thereof. Techniques for determining the type of feedback to provide are described in further detail elsewhere herein, including with reference to FIGS. 2 and 4, as well as Tables 1-3.

Figure 4:
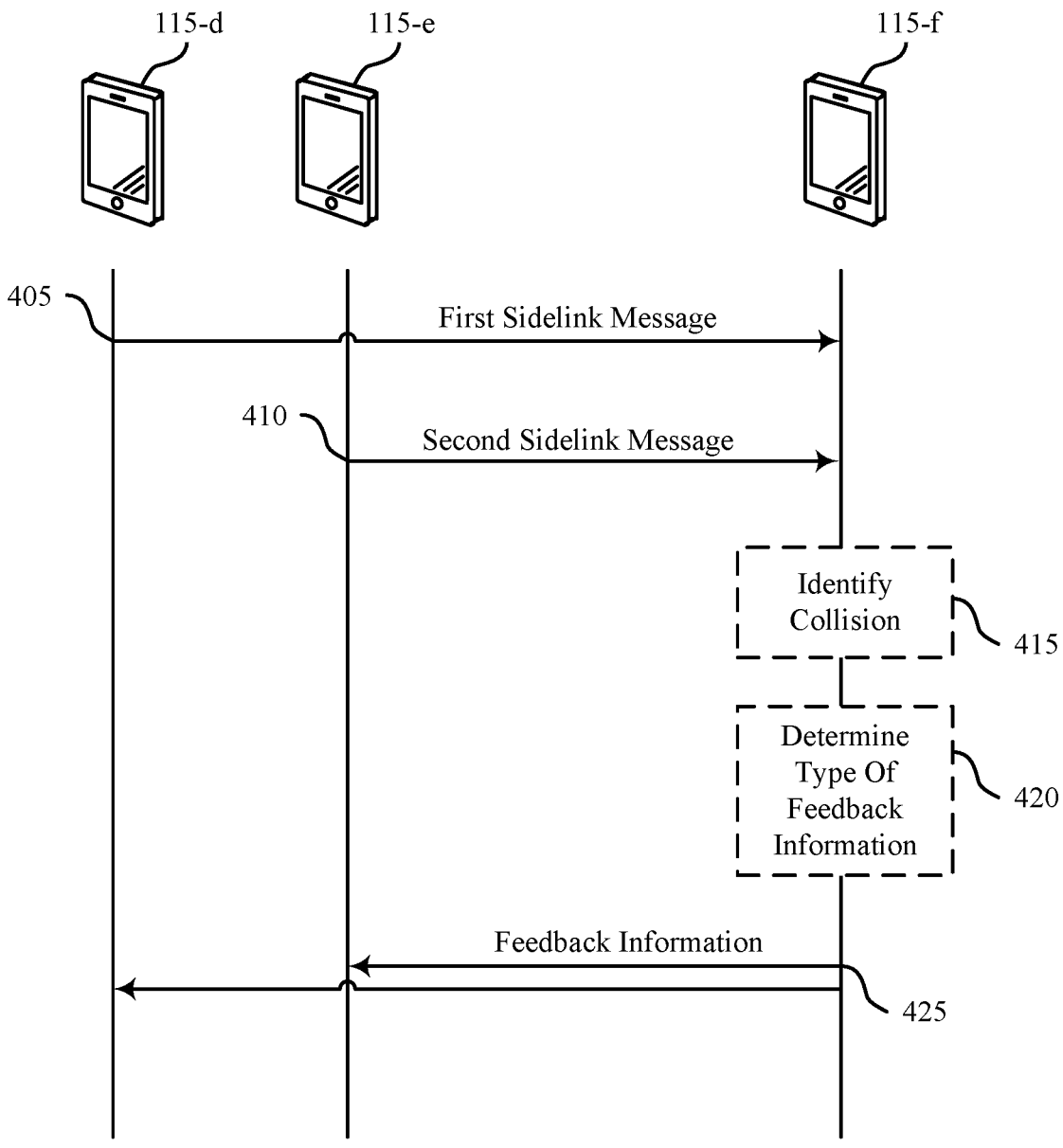
FIG. 4 shows an example of a process flow that supports handling resource collisions based on sidelink feedback transmission opportunities in accordance with one or more aspects of the present disclosure.

FIG. 4 shows an example of a process flow 400 that supports handling resource collisions based on sidelink feedback transmission opportunities in accordance with one or more aspects of the present disclosure. The process flow 400 may implement or be implemented by aspects of the wireless communications systems 100 and 200 or the feedback timeline configurations 300, as described with reference to FIGS. 1-3. For example, the process flow 400 illustrates communications between a UE 115-*d*, a UE 115-*e*, and a UE 115-*f*, which may represent examples of UEs 115 as described with reference to FIGS. 1-3. In this example, the UE 115-*f* may determine a type of feedback information to provide via a sidelink feedback transmission occasion when feedback for two or more sidelink messages collides during the sidelink feedback transmission occasion.

In the following description of the process flow 400, the operations between the UEs 115-*d*, 115-*e*, and 115-*f* may be performed in different orders or at different times. Some operations may also be left out of the process flow 400, or other operations may be added. Although the UEs 115-*d*, 115-*e*, and 115-*f* are shown performing the operations of the process flow 400, some aspects of some operations may also be performed by one or more other wireless devices.

At 405, the UE 115-*f* may receive a first sidelink message from the UE 115-*d*. The first sidelink message may be associated with a sidelink feedback transmission occasion (e.g., PSFCH occasion). For example, the UE 115-*d* may transmit SCI that schedules the first sidelink message via a PSSCH and that indicates PSFCH resources for feedback responsive to the first sidelink message.

At 410, the UE 115-*f* may receive a second sidelink message from the UE 115-*e*. The second sidelink message may be associated with first sidelink feedback transmission occasion (e.g., the same PSFCH occasion as the first sidelink message). For example, the UE 115-*e* may transmit SCI that schedules the second sidelink message via a PSSCH and that indicates PSFCH resources for feedback responsive to the second sidelink message.

At 415, in some examples, the UE 115-*f* may identify a collision associated with feedback for the first sidelink message and the second sidelink message. For example, feedback for the first sidelink message and feedback for the second sidelink message may collide in the sidelink feedback transmission occasion. In some examples, the first sidelink message and the second sidelink message may be associated with a same hashing function within the sidelink feedback transmission occasion. As described with reference to FIG. 3C, if the feedback for two messages is associated with a same hashing function and transmitted via a same feedback transmission occasion, the feedback may collide. Additionally, or alternatively, a first set of sidelink resources associated with the first sidelink message may be at least partially overlapping in time, frequency, or both with a second set of sidelink resources associated with the second sidelink message, which may cause the collision, as described with reference to FIGS. 3A and 3B.

At 420, in some examples, the UE 115-*f* may determine a type of feedback information to provide via the transmission occasion based on the first sidelink message and the second sidelink message both being associated with the sidelink feedback transmission occasion (e.g., based on identifying the collision). The UE 115-*f* may determine the type of feedback information based on a quantity of additional sidelink feedback transmission occasions subsequent to the sidelink feedback transmission occasion that are also available for transmission of first feedback responsive to the first sidelink message or second feedback associated with the second sidelink message.

At 425, the UE 115-*f* may provide the determined type of feedback information via the sidelink feedback transmission occasion based on the first and second sidelink messages both being associated with (e.g., colliding in) the sidelink feedback transmission occasion. Providing the type of feedback information may include, for example, transmitting an ACK, transmitting a NACK, or performing DTX (e.g., refraining from transmitting) during the sidelink feedback transmission occasion. The UE 115-*d* and the UE 115-*e* may both monitor the sidelink feedback transmission occasion for sidelink feedback responsive to the first and second sidelink messages, respectively. Accordingly, both the UE 115-*d* and the UE 115-*f* may monitor for and receive the determined type of feedback information. For example, if the UE 115-*f* transmits an ACK or a NACK, the UE 115-*f* may transmit the ACK or NACK to both the UE 115-*d* and the UE 115-*e*.

The UE 115-*f* may perform DTX, transmit an ACK, or transmit a NACK at 425 based on one or more factors, including a type of feedback information associated with each of the first and second sidelink messages and a quantity of additional sidelink feedback transmission occasions that are subsequent to the sidelink feedback transmission occasion in time and that are available for transmission of feedback responsive to either the first or second sidelink messages. For example, the UE 115-*f* may provide different types of feedback information based on whether the UE 115-*f* successfully or unsuccessfully decoded each of the sidelink messages, whether the UE 115-*f* operates in a first or second feedback mode associated with unicast, groupcast, or both, and whether the additional subsequent sidelink feedback transmission occasions are available, as described in further detail elsewhere herein, including with reference to FIG. 2 and Tables 1-3.

The UE 115-*f* may thereby determine a type of feedback information to provide via a sidelink feedback transmission occasion in which two or more feedback messages may collide, which may improve throughput of the sidelink communications, improve coordination between devices, and reduce latency, among other examples.

Figure 5:
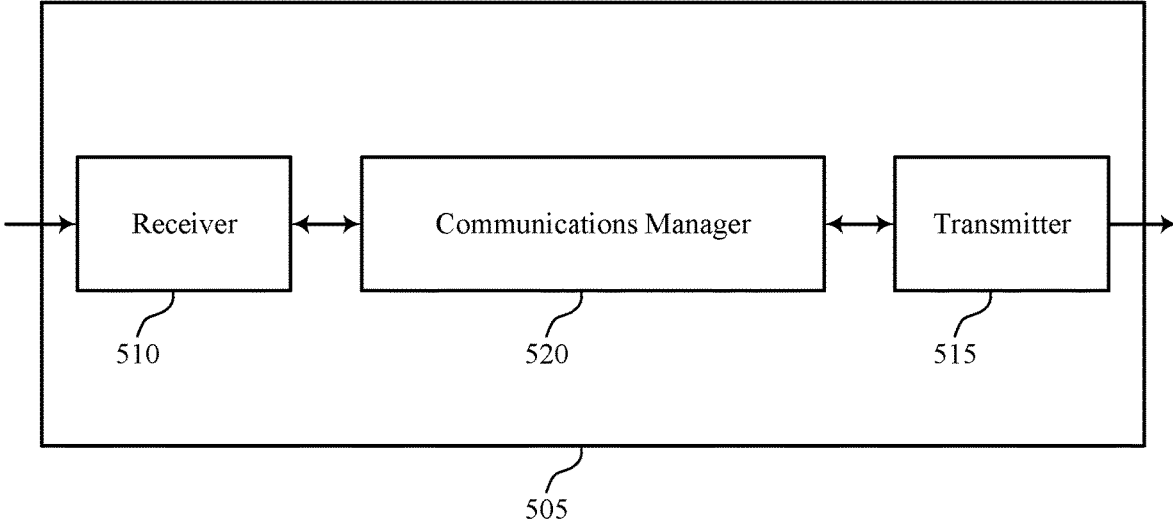
FIGS. 5 and 6 show block diagrams of devices that support handling resource collisions based on sidelink feedback transmission opportunities in accordance with one or more aspects of the present disclosure.

FIG. 5 shows a block diagram 500 of a device 505 that supports handling resource collisions based on sidelink feedback transmission opportunities in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include one or more memories storing processor-executable code and one or more processors coupled with the one or more memories and individually or collectively operable to execute the code to cause the device to support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to handling resource collisions based on sidelink feedback transmission opportunities).

Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to handling resource collisions based on sidelink feedback transmission opportunities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of handling resource collisions based on sidelink feedback transmission opportunities as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions or processor-executable code stored in the one or more memories).

Additionally, or alternatively, the communications manager 520, the receiver 510, the transmitter 515, or various combinations or components thereof may be implemented in code (e.g., as communications management software or firmware) executed by one or more processors. If implemented in code executed by one or more processors, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communication by a UE in accordance with examples as disclosed herein. For example, the communications manager 520 is capable of, configured to, or operable to support a means for receiving a first sidelink message, the first sidelink message associated with a sidelink feedback transmission occasion. The communications manager 520 is capable of, configured to, or operable to support a means for receiving a second sidelink message, the second sidelink message also associated with the sidelink feedback transmission occasion. The communications manager 520 is capable of, configured to, or operable to support a means for providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

By including or configuring the communications manager 520 in accordance with examples as described herein, the device 505 (e.g., one or more processors controlling or otherwise coupled with the receiver 510, the transmitter 515, the communications manager 520, or a combination thereof) may support techniques for reduced processing, reduced power consumption, and more efficient utilization of communication resources, among other possibilities.

Figure 6:
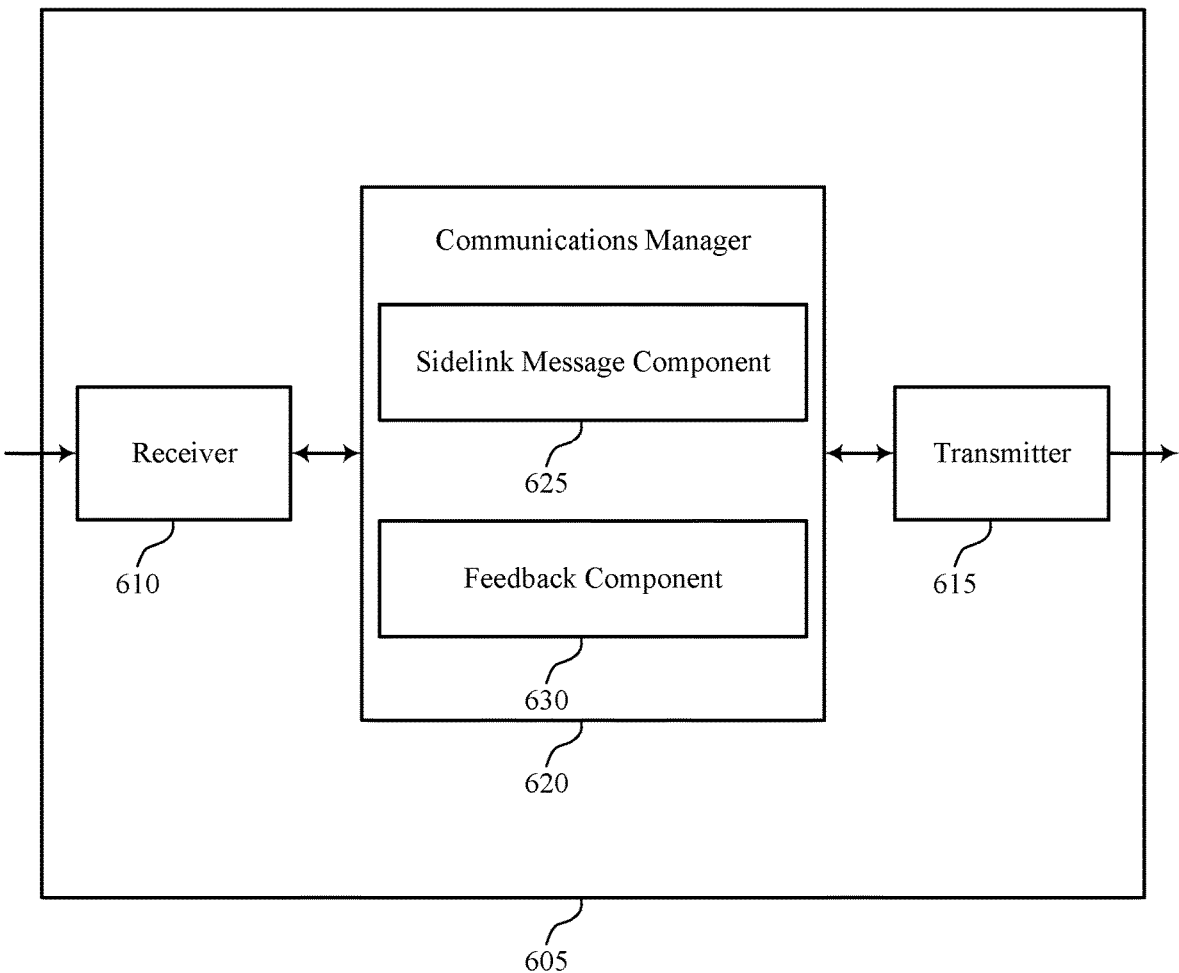

FIG. 6 shows a block diagram 600 of a device 605 that supports handling resource collisions based on sidelink feedback transmission opportunities in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include one or more memories that store processor-executable code, and one or more processors which may be coupled with the one or more memories and may be individually or collectively operable to execute the processor-executable code to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to handling resource collisions based on sidelink feedback transmission opportunities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to handling resource collisions based on sidelink feedback transmission opportunities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of handling resource collisions based on sidelink feedback transmission opportunities as described herein. For example, the communications manager 620 may include a sidelink message component 625 a feedback component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication by a UE in accordance with examples as disclosed herein. The sidelink message component 625 is capable of, configured to, or operable to support a means for receiving a first sidelink message, the first sidelink message associated with a sidelink feedback transmission occasion. The sidelink message component 625 is capable of, configured to, or operable to support a means for receiving a second sidelink message, the second sidelink message also associated with the sidelink feedback transmission occasion. The feedback component 630 is capable of, configured to, or operable to support a means for providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

Figure 7:
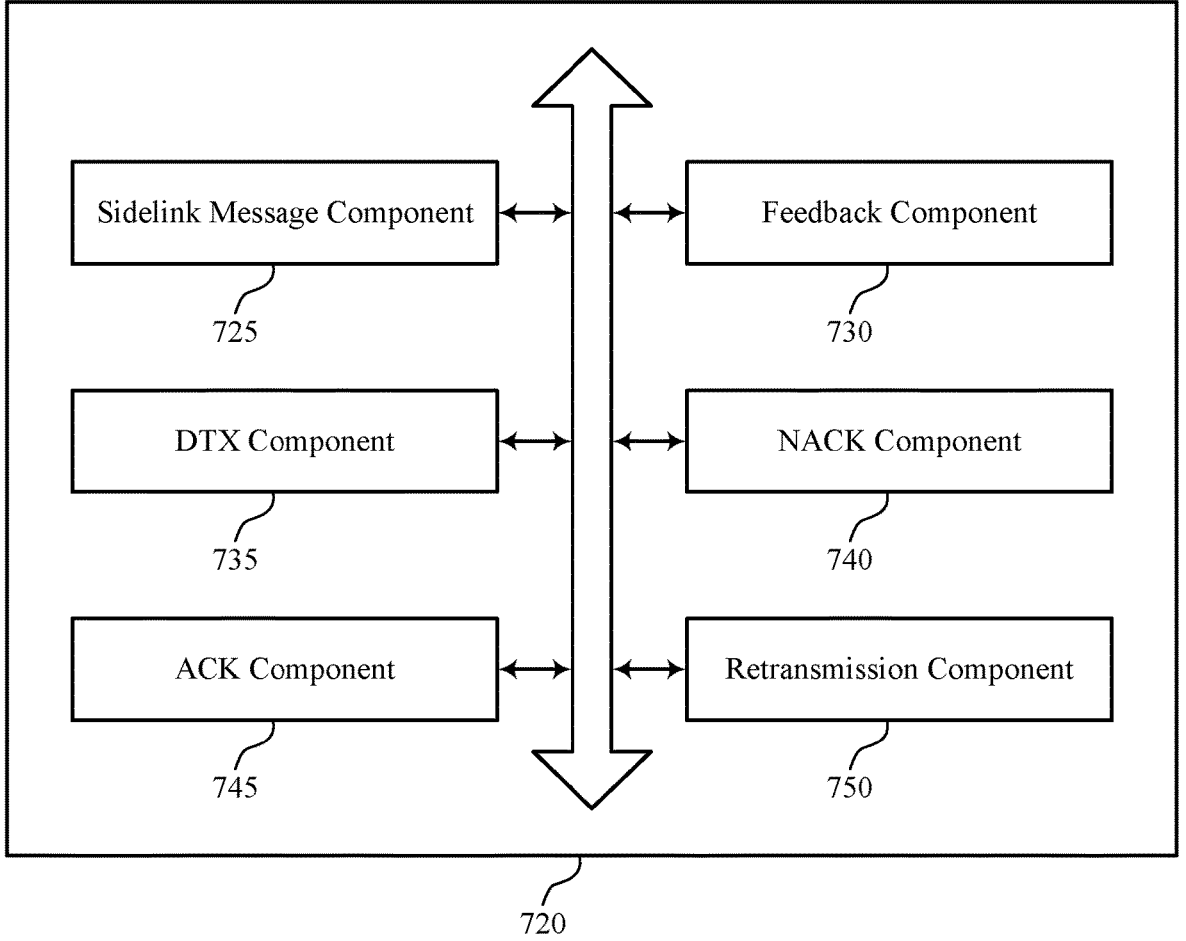
FIG. 7 shows a block diagram of a communications manager that supports handling resource collisions based on sidelink feedback transmission opportunities in accordance with one or more aspects of the present disclosure.

FIG. 7 shows a block diagram 700 of a communications manager 720 that supports handling resource collisions based on sidelink feedback transmission opportunities in accordance with one or more aspects of the present disclosure. The communications manager 720 may be an example of aspects of a communications manager 520, a communications manager 620, or both, as described herein. The communications manager 720, or various components thereof, may be an example of means for performing various aspects of handling resource collisions based on sidelink feedback transmission opportunities as described herein. For example, the communications manager 720 may include a sidelink message component 725, a feedback component 730, a DTX component 735, a NACK component 740, an ACK component 745, a retransmission component 750, or any combination thereof. Each of these components, or components or subcomponents thereof (e.g., one or more processors, one or more memories), may communicate, directly or indirectly, with one another (e.g., via one or more buses).

Additionally, or alternatively, the communications manager 720 may support wireless communication by a UE in accordance with examples as disclosed herein. The sidelink message component 725 is capable of, configured to, or operable to support a means for receiving a first sidelink message, the first sidelink message associated with a sidelink feedback transmission occasion. In some examples, the sidelink message component 725 is capable of, configured to, or operable to support a means for receiving a second sidelink message, the second sidelink message also associated with the sidelink feedback transmission occasion. The feedback component 730 is capable of, configured to, or operable to support a means for providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

In some examples, to support providing the type of feedback information, the DTX component 735 is capable of, configured to, or operable to support a means for performing DTX during the sidelink feedback transmission occasion, where the provided type of feedback information is a DTX type based on the first feedback including a positive ACK and the second feedback including a NACK and further based on at least one of the one or more additional sidelink feedback transmission occasions being available for transmission of the second feedback including the NACK.

In some examples, the NACK component 740 is capable of, configured to, or operable to support a means for transmitting the second feedback including the NACK via the at least one additional sidelink feedback transmission occasion based on performing the DTX during the sidelink feedback transmission occasion.

In some examples, the first feedback and the second feedback both are unicast or groupcast feedback of a first type or a second type, the first type associated with indication of positive ACKs via DTX and the second type associated with indication of positive ACKs via transmission of positive ACKs.

In some examples, the first feedback is unicast feedback or groupcast feedback of a second type, the second type associated with indication of positive ACKs via transmission of positive ACKs. In some examples, the second feedback is groupcast feedback of a first type, the first type associated with indication of positive ACKs via DTX.

In some examples, the first feedback is groupcast feedback of a first type, the first type associated with indication of positive ACKs via DTX. In some examples, the second feedback is unicast feedback or groupcast feedback of a second type, the second type associated with indication of positive ACKs via transmission of positive ACKs.

In some examples, to support providing the type of feedback information, the NACK component 740 is capable of, configured to, or operable to support a means for transmitting a NACK via the sidelink feedback transmission occasion, where the provided type of feedback information is the NACK based on at least one of the first feedback and the second feedback including the NACK.

In some examples, the retransmission component 750 is capable of, configured to, or operable to support a means for receiving a retransmission of the first sidelink message and the second sidelink message based on transmitting the NACK.

In some examples, the first feedback is groupcast feedback of a first type, the first type associated with indication of positive ACKs via DTX. In some examples, the second feedback is unicast feedback or groupcast feedback of a second type, the second type associated with indication of positive ACKs via transmission of positive ACKs.

In some examples, the second feedback is the NACK. In some examples, transmitting the NACK is further based on the quantity of one or more additional sidelink feedback transmission occasions that are subsequent to the sidelink feedback transmission occasion and that are available for transmission of the second feedback being zero.

In some examples, the first feedback and the second feedback both are unicast or groupcast feedback of a first type or a second type, the first type associated with indication of positive ACKs via DTX and the second type associated with indication of positive ACKs via transmission of positive ACKs.

In some examples, to support providing the type of feedback information, the DTX component 735 is capable of, configured to, or operable to support a means for performing DTX during the sidelink feedback transmission occasion, where the provided type of feedback information is a DTX type based on both the first feedback and the second feedback including positive feedback of a feedback type that is associated with indication of positive ACKs via DTX.

In some examples, to support providing the type of feedback information, the NACK component 740 is capable of, configured to, or operable to support a means for transmitting a NACK via the sidelink feedback transmission occasion, where the provided type of feedback information is the NACK based on both the first feedback and the second feedback including the NACK.

In some examples, the first feedback is groupcast feedback of a first type, the first type associated with indication of positive ACKs via DTX. In some examples, the second feedback is unicast feedback or groupcast feedback of a second type, the second type associated with indication of positive ACKs via transmission of positive ACKs.

In some examples, to support providing the type of feedback information, the ACK component 745 is capable of, configured to, or operable to support a means for transmitting a positive ACK via the sidelink feedback transmission occasion, where the provided type of feedback information is the positive ACK based on both the first feedback and the second feedback including the positive ACK.

In some examples, the first feedback is groupcast feedback of a first type, the first type associated with indication of positive ACKs via DTX. In some examples, the second feedback is unicast feedback or groupcast feedback of a second type, the second type associated with indication of positive ACKs via transmission of positive ACKs.

In some examples, the feedback component 730 is capable of, configured to, or operable to support a means for determining the type of feedback information based on the first sidelink message and the second sidelink message being associated with a same hashing function within the sidelink feedback transmission occasion.

In some examples, the feedback component 730 is capable of, configured to, or operable to support a means for determining the type of feedback information based on a first set of one or more sidelink feedback resources associated with the first sidelink message at least partially overlapping in time, frequency, or both, with a second set of one or more sidelink feedback resources associated with the second sidelink message within the sidelink feedback transmission occasion.

In some examples, the provided type of feedback information is one of a positive ACK, a NACK, or a DTX type.

Figure 8:
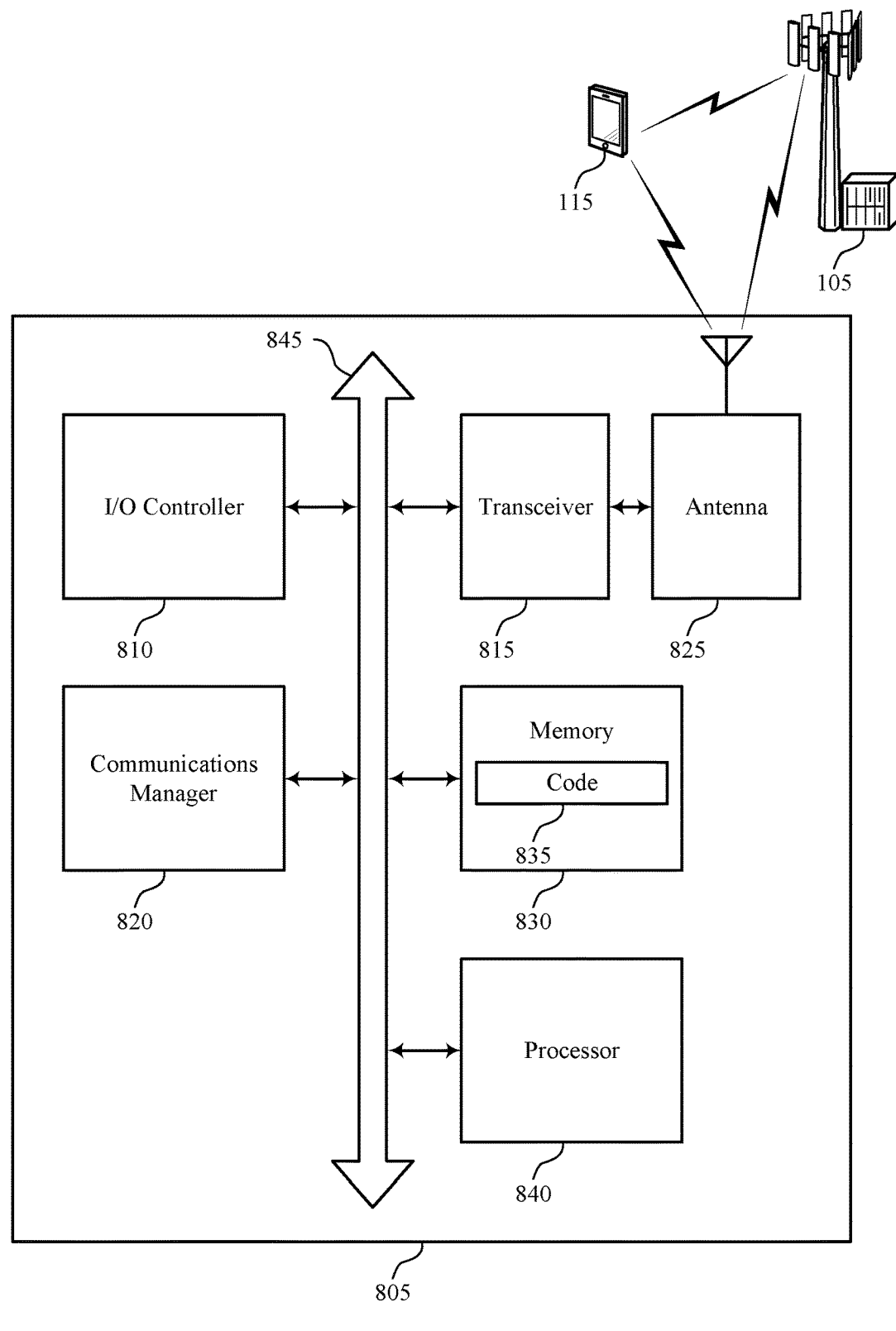
FIG. 8 shows a diagram of a system including a device that supports handling resource collisions based on sidelink feedback transmission opportunities in accordance with one or more aspects of the present disclosure.

FIG. 8 shows a diagram of a system 800 including a device 805 that supports handling resource collisions based on sidelink feedback transmission opportunities in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, one or more memories 830, code 835, and one or more processors 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the one or more processors 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The one or more memories 830 may include random access memory (RAM) and read-only memory (ROM). The one or more memories 830 may store computer-readable, computer-executable code 835 including instructions that, when executed by the one or more processors 840 individually or collectively, cause the device 805 to perform various functions described herein. The code 835 may be stored in a non-transitory computer-readable medium such as system memory or another type of memory. In some cases, the code 835 may not be directly executable by the one or more processors 840 but may cause a computer (e.g., when compiled and executed) to perform functions described herein. In some cases, the one or more memories 830 may contain, among other things, a basic I/O system (BIOS) which may control basic hardware or software operation such as the interaction with peripheral components or devices.

The one or more processors 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the one or more processors 840 may be configured to operate a memory array using a memory controller. In some other cases, a memory controller may be integrated into the one or more processors 840. The one or more processors 840 may be configured to execute (e.g., individually or collectively) computer-readable instructions stored in a memory (e.g., the one or more memories 830) to cause the device 805 to perform various functions (e.g., functions or tasks supporting handling resource collisions based on sidelink feedback transmission opportunities). For example, the device 805 or a component of the device 805 may include one or more processors 840 and one or more memories 830 coupled with or to the one or more processors 840, the one or more processors 840 and one or more memories 830 configured to perform various functions described herein. In some examples, the one or more processors 840 may include multiple processors and the one or more memories 830 may include multiple memories. One or more of the multiple processors may be coupled with one or more of the multiple memories, which may, individually or collectively, be configured to perform various functions herein.

Additionally, or alternatively, the communications manager 820 may support wireless communication by a UE in accordance with examples as disclosed herein. For example, the communications manager 820 is capable of, configured to, or operable to support a means for receiving a first sidelink message, the first sidelink message associated with a sidelink feedback transmission occasion. The communications manager 820 is capable of, configured to, or operable to support a means for receiving a second sidelink message, the second sidelink message also associated with the sidelink feedback transmission occasion. The communications manager 820 is capable of, configured to, or operable to support a means for providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message.

By including or configuring the communications manager 820 in accordance with examples as described herein, the device 805 may support techniques for improved communication reliability, reduced latency, reduced power consumption, more efficient utilization of communication resources, and improved coordination between devices, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the one or more processors 840, the one or more memories 830, the code 835, or any combination thereof. For example, the code 835 may include instructions executable by the one or more processors 840 to cause the device 805 to perform various aspects of handling resource collisions based on sidelink feedback transmission opportunities as described herein, or the one or more processors 840 and the one or more memories 830 may be otherwise configured to, individually or collectively, perform or support such operations.

FIG. 9 shows a flowchart illustrating a method 900 that supports handling resource collisions based on sidelink feedback transmission opportunities in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving a first sidelink message, the first sidelink message associated with a sidelink feedback transmission occasion. The operations of block 905 may be performed in accordance with examples as disclosed herein. In some examples, aspects of the operations of 905 may be performed by a sidelink message component 725 as described with reference to FIG. 7.

At 910, the method may include receiving a second sidelink message, the second sidelink message also associated with the sidelink feedback transmission occasion. The operations of block 910 may be performed in accordance with examples as disclosed herein. In some examples, aspects of the operations of 910 may be performed by a sidelink message component 725 as described with reference to FIG. 7.

At 915, the method may include providing a type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message. The operations of block 915 may be performed in accordance with examples as disclosed herein. In some examples, aspects of the operations of 915 may be performed by a feedback component 730 as described with reference to FIG. 7.

FIG. 10 shows a flowchart illustrating a method 1000 that supports handling resource collisions based on sidelink feedback transmission opportunities in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions.

Additionally, or alternatively, the UE may perform aspects of the described functions using special-purpose hardware.

At 1005, the method may include receiving a first sidelink message, the first sidelink message associated with a sidelink feedback transmission occasion. The operations of block 1005 may be performed in accordance with examples as disclosed herein. In some examples, aspects of the operations of 1005 may be performed by a sidelink message component 725 as described with reference to FIG. 7.

At 1010, the method may include receiving a second sidelink message, the second sidelink message also associated with the sidelink feedback transmission occasion. The operations of block 1010 may be performed in accordance with examples as disclosed herein. In some examples, aspects of the operations of 1010 may be performed by a sidelink message component 725 as described with reference to FIG. 7.

At 1015, the method may include providing a type of feedback information via the sidelink feedback transmission occasion based on the first sidelink message and the second sidelink message both being associated with the sidelink feedback transmission occasion, where providing the type of feedback information includes performing DTX during the sidelink feedback transmission occasion, the provided type of feedback information including a DTX type based on first feedback associated with the first sidelink message including an ACK and second feedback associated with the second sidelink message including a NACK and further based on at least one of a quantity of one or more additional sidelink feedback transmission occasions subsequent to the sidelink feedback transmission occasion being available for transmission of the second feedback including the NACK. The operations of block 1015 may be performed in accordance with examples as disclosed herein. In some examples, aspects of the operations of 1015 may be performed by a feedback component 730 as described with reference to FIG. 7.

FIG. 11 shows a flowchart illustrating a method 1100 that supports handling resource collisions based on sidelink feedback transmission opportunities in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving a first sidelink message, the first sidelink message associated with a sidelink feedback transmission occasion. The operations of block 1105 may be performed in accordance with examples as disclosed herein. In some examples, aspects of the operations of 1105 may be performed by a sidelink message component 725 as described with reference to FIG. 7.

At 1110, the method may include receiving a second sidelink message, the second sidelink message also associated with the sidelink feedback transmission occasion. The operations of block 1110 may be performed in accordance with examples as disclosed herein. In some examples, aspects of the operations of 1110 may be performed by a sidelink message component 725 as described with reference to FIG. 7.

At 1115, the method may include providing a type of feedback information via the sidelink feedback transmission occasion based on the first sidelink message and the second sidelink message both being associated with the sidelink feedback transmission occasion, where providing the type of feedback information includes transmitting a NACK via the sidelink feedback transmission occasion, the provided type of feedback information being the NACK based on at least one of first feedback associated with the first sidelink message and second feedback associated with the second sidelink message being the NACK and further based on a quantity of one or more additional sidelink feedback transmission occasions subsequent to the sidelink feedback transmission occasion that are also available for transmission of either the first feedback associated with the first sidelink message or the second feedback associated with the second sidelink message. The operations of block 1115 may be performed in accordance with examples as disclosed herein. In some examples, aspects of the operations of 1115 may be performed by a feedback component 730 as described with reference to FIG. 7.

FIG. 12 shows a flowchart illustrating a method 1200 that supports handling resource collisions based on sidelink feedback transmission opportunities in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving a first sidelink message, the first sidelink message associated with a sidelink feedback transmission occasion. The operations of block 1205 may be performed in accordance with examples as disclosed herein. In some examples, aspects of the operations of 1205 may be performed by a sidelink message component 725 as described with reference to FIG. 7.

At 1210, the method may include receiving a second sidelink message, the second sidelink message also associated with the sidelink feedback transmission occasion. The operations of block 1210 may be performed in accordance with examples as disclosed herein. In some examples, aspects of the operations of 1210 may be performed by a sidelink message component 725 as described with reference to FIG. 7.

At 1215, the method may include determining a type of feedback information based on the first sidelink message and the second sidelink message being associated with a same hashing function within the sidelink feedback transmission occasion. The operations of block 1215 may be performed in accordance with examples as disclosed herein. In some examples, aspects of the operations of 1215 may be performed by a feedback component 730 as described with reference to FIG. 7.

At 1220, the method may include providing the determined type of feedback information via the sidelink feedback transmission occasion based on the first sidelink message and the second sidelink message both being associated with the sidelink feedback transmission occasion, where the provided type of feedback information is based on a quantity of one or more additional sidelink feedback transmission occasions subsequent to the sidelink feedback transmission occasion that are also available for transmission of either first feedback associated with the first sidelink message or second feedback associated with the second sidelink message. The operations of block 1220 may be performed in accordance with examples as disclosed herein. In some examples, aspects of the operations of 1220 may be performed by a feedback component 730 as described with reference to FIG. 7.

The following provides an overview of aspects of the present disclosure:

Aspect 1: A method for wireless communication by a UE, comprising: receiving a first sidelink message, the first sidelink message associated with a sidelink feedback transmission occasion; receiving a second sidelink message, the second sidelink message also associated with the sidelink feedback transmission occasion; and providing a type of feedback information via the sidelink feedback transmission occasion based at least in part on the first sidelink message and the second sidelink message both being associated with the sidelink feedback transmission occasion, wherein the provided type of feedback information is based at least in part on a quantity of one or more additional sidelink feedback transmission occasions subsequent to the sidelink feedback transmission occasion that are also available for transmission of either first feedback associated with the first sidelink message or second feedback associated with the second sidelink message.

Aspect 2: The method of aspect 1, wherein providing the type of feedback information comprises: performing DTX during the sidelink feedback transmission occasion, wherein the provided type of feedback information comprises a DTX type based at least in part on the first feedback comprising a positive ACK and the second feedback comprising a NACK and further based at least in part on at least one of the one or more additional sidelink feedback transmission occasions being available for transmission of the second feedback comprising the NACK.

Aspect 3: The method of aspect 2, further comprising: transmitting the second feedback comprising the NACK via the at least one additional sidelink feedback transmission occasion based at least in part on performing the DTX during the sidelink feedback transmission occasion.

Aspect 4: The method of any of aspects 2 through 3, wherein the first feedback and the second feedback both comprise unicast or groupcast feedback of a first type or a second type, the first type associated with indication of positive ACKs via DTX and the second type associated with indication of positive ACKs via transmission of positive ACKs.

Aspect 5: The method of any of aspects 2 through 3, wherein the first feedback comprises unicast feedback or groupcast feedback of a second type, the second type associated with indication of positive ACKs via transmission of positive ACKs; and the second feedback comprises groupcast feedback of a first type, the first type associated with indication of positive ACKs via DTX.

Aspect 6: The method of any of aspects 2 through 3, wherein the first feedback comprises groupcast feedback of a first type, the first type associated with indication of positive ACKs via DTX; and the second feedback comprises unicast feedback or groupcast feedback of a second type, the second type associated with indication of positive ACKs via transmission of positive ACKs.

Aspect 7: The method of aspect 1, wherein providing the type of feedback information comprises: transmitting a NACK via the sidelink feedback transmission occasion, wherein the provided type of feedback information comprises the NACK based at least in part on at least one of the first feedback and the second feedback comprising the NACK.

Aspect 8: The method of aspect 7, further comprising: receiving a retransmission of the first sidelink message and the second sidelink message based at least in part on transmitting the NACK.

Aspect 9: The method of any of aspects 7 through 8, wherein the first feedback comprises groupcast feedback of a first type, the first type associated with indication of positive ACKs via DTX; and the second feedback comprises unicast feedback or groupcast feedback of a second type, the second type associated with indication of positive ACKs via transmission of positive ACKs.

Aspect 10: The method of any of aspects 7 through 9, wherein the second feedback comprises the NACK, and transmitting the NACK is further based at least in part on the quantity of one or more additional sidelink feedback transmission occasions that are subsequent to the sidelink feedback transmission occasion and that are available for transmission of the second feedback being zero.

Aspect 11: The method of aspect 10, wherein the first feedback and the second feedback both comprise unicast or groupcast feedback of a first type or a second type, the first type associated with indication of positive ACKs via DTX and the second type associated with indication of positive ACKs via transmission of positive ACKs.

Aspect 12: The method of aspect 1, wherein providing the type of feedback information comprises: performing DTX during the sidelink feedback transmission occasion, wherein the provided type of feedback information comprises a DTX type based at least in part on both the first feedback and the second feedback comprising positive feedback of a feedback type that is associated with indication of positive ACKs via DTX.

Aspect 13: The method of aspect 1, wherein providing the type of feedback information comprises: transmitting a NACK via the sidelink feedback transmission occasion, wherein the provided type of feedback information comprises the NACK based at least in part on both the first feedback and the second feedback comprising the NACK.

Aspect 14: The method of aspect 13, wherein the first feedback comprises groupcast feedback of a first type, the first type associated with indication of positive ACKs via DTX; and the second feedback comprises unicast feedback or groupcast feedback of a second type, the second type associated with indication of positive ACKs via transmission of positive ACKs.

Aspect 15: The method of aspect 1, wherein providing the type of feedback information comprises: transmitting a positive ACK via the sidelink feedback transmission occasion, wherein the provided type of feedback information comprises the positive ACK based at least in part on both the first feedback and the second feedback comprising the positive ACK.

Aspect 16: The method of aspect 15, wherein the first feedback comprises groupcast feedback of a first type, the first type associated with indication of positive ACKs via DTX; and the second feedback comprises unicast feedback or groupcast feedback of a second type, the second type associated with indication of positive ACKs via transmission of positive ACKs.

Aspect 17: The method of any of aspects 1 through 16, further comprising: determining the type of feedback information based at least in part on the first sidelink message and the second sidelink message being associated with a same hashing function within the sidelink feedback transmission occasion.

Aspect 18: The method of any of aspects 1 through 16, further comprising: determining the type of feedback information based at least in part on a first set of one or more sidelink feedback resources associated with the first sidelink message at least partially overlapping in time, frequency, or both, with a second set of one or more sidelink feedback resources associated with the second sidelink message within the sidelink feedback transmission occasion.

Aspect 19: The method of any of aspects 1 through 18, wherein the provided type of feedback information comprises one of a positive ACK, a NACK, or a DTX type.

Aspect 20: A UE for wireless communication, comprising one or more memories storing processor-executable code, and one or more processors coupled with the one or more memories and individually or collectively operable to execute the code to cause the UE to perform a method of any of aspects 1 through 19.

Aspect 21: A UE for wireless communication, comprising at least one means for performing a method of any of aspects 1 through 19.

Aspect 22: A non-transitory computer-readable medium storing code for wireless communication, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

48

What is claimed is:

1. An user equipment (UE) for wireless communication, comprising:
   one or more memories storing processor-executable code; and
   one or more processors coupled with the one or more memories and individually or collectively operable to execute the processor-executable code to cause the UE to:
   receive a first sidelink message, the first sidelink message associated with a sidelink feedback transmission occasion;
   receive a second sidelink message, the second sidelink message also associated with the sidelink feedback transmission occasion; and
   provide a type of feedback information via the sidelink feedback transmission occasion based at least in part on the first sidelink message and the second sidelink message both being associated with the sidelink feedback transmission occasion, wherein the provided type of feedback information is based at least in part on a quantity of one or more additional sidelink feedback transmission occasions subsequent to the sidelink feedback transmission occasion that are also available for transmission of either first feedback associated with the first sidelink message or second feedback associated with the second sidelink message.

2. The UE of claim 1, wherein, to provide the type of feedback information, the one or more processors are individually or collectively operable to execute the processor-executable code to cause the UE to:
   perform discontinuous transmission during the sidelink feedback transmission occasion, wherein the provided type of feedback information comprises a discontinuous transmission type based at least in part on the first feedback comprising a positive acknowledgment and the second feedback comprising a negative acknowledgment and further based at least in part on at least one of the one or more additional sidelink feedback transmission occasions being available for transmission of the second feedback comprising the negative acknowledgment.

3. The UE of claim 2, wherein the one or more processors are individually or collectively further operable to execute the processor-executable code to cause the UE to:
   transmit the second feedback comprising the negative acknowledgment via the at least one additional sidelink feedback transmission occasion based at least in part on performing the discontinuous transmission during the sidelink feedback transmission occasion.

4. The UE of claim 2, wherein the first feedback and the second feedback both comprise unicast or groupcast feedback of a first type or a second type, the first type associated with indication of positive acknowledgments via discontinuous transmission and the second type associated with indication of positive acknowledgments via transmission of positive acknowledgments.

5. The UE of claim 2, wherein:
   the first feedback comprises unicast feedback or groupcast feedback of a second type, the second type associated with indication of positive acknowledgments via transmission of positive acknowledgments; and
   the second feedback comprises groupcast feedback of a first type, the first type associated with indication of positive acknowledgments via discontinuous transmission.

49

6. The UE of claim 2, wherein:

the first feedback comprises groupcast feedback of a first type, the first type associated with indication of positive acknowledgments via discontinuous transmission; and the second feedback comprises unicast feedback or groupcast feedback of a second type, the second type associated with indication of positive acknowledgments via transmission of positive acknowledgments.

7. The UE of claim 1, wherein, to provide the type of feedback information, the one or more processors are individually or collectively operable to execute the processor-executable code to cause the UE to:

transmit a negative acknowledgment via the sidelink feedback transmission occasion, wherein the provided type of feedback information comprises the negative acknowledgment based at least in part on at least one of the first feedback and the second feedback comprising the negative acknowledgment.

8. The UE of claim 7, wherein the one or more processors are individually or collectively further operable to execute the processor-executable code to cause the UE to:

receive a retransmission of the first sidelink message and the second sidelink message based at least in part on transmitting the negative acknowledgment.

9. The UE of claim 7, wherein:

the first feedback comprises groupcast feedback of a first type, the first type associated with indication of positive acknowledgments via discontinuous transmission; and the second feedback comprises unicast feedback or groupcast feedback of a second type, the second type associated with indication of positive acknowledgments via transmission of positive acknowledgments.

10. The UE of claim 7, wherein:

the second feedback comprises the negative acknowledgment, and the one or more processors are individually or collectively operable to execute the processor-executable code to cause the UE to transmit the negative acknowledgment further based at least in part on the quantity of one or more additional sidelink feedback transmission occasions that are subsequent to the sidelink feedback transmission occasion and that are available for transmission of the second feedback being zero.

11. The UE of claim 10, wherein the first feedback and the second feedback both comprise unicast or groupcast feedback of a first type or a second type, the first type associated with indication of positive acknowledgments via discontinuous transmission and the second type associated with indication of positive acknowledgments via transmission of positive acknowledgments.

12. The UE of claim 1, wherein, to provide the type of feedback information, the one or more processors are individually or collectively operable to execute the processor-executable code to cause the UE to: perform discontinuous transmission during the sidelink feedback transmission occasion, wherein the provided type of feedback information comprises a discontinuous transmission type based at least in part on both the first feedback and the second feedback comprising positive feedback of a feedback type that is associated with indication of positive acknowledgments via discontinuous transmission.

13. The UE of claim 1, wherein, to provide the type of feedback information, the one or more processors are individually or collectively operable to execute the processor-executable code to cause the UE to:

transmit a negative acknowledgment via the sidelink feedback transmission occasion, wherein the provided type of feedback information comprises the negative acknowledgment based at least in part on both the first feedback and the second feedback comprising the negative acknowledgment.

14. The UE of claim 13, wherein:

the first feedback comprises groupcast feedback of a first type, the first type associated with indication of positive acknowledgments via discontinuous transmission; and the second feedback comprises unicast feedback or groupcast feedback of a second type, the second type associated with indication of positive acknowledgments via transmission of positive acknowledgments.

15. The UE of claim 1, wherein, to provide the type of feedback information, the one or more processors are individually or collectively operable to execute the processor-executable code to cause the UE to:

transmit a positive acknowledgment via the sidelink feedback transmission occasion, wherein the provided type of feedback information comprises the positive acknowledgment based at least in part on both the first feedback and the second feedback comprising the positive acknowledgment.

16. The UE of claim 15, wherein:

the first feedback comprises groupcast feedback of a first type, the first type associated with indication of positive acknowledgments via discontinuous transmission; and the second feedback comprises unicast feedback or groupcast feedback of a second type, the second type associated with indication of positive acknowledgments via transmission of positive acknowledgments.

17. The UE of claim 1, wherein the one or more processors are individually or collectively further operable to execute the processor-executable code to cause the UE to:

determine the type of feedback information based at least in part on the first sidelink message and the second sidelink message being associated with a same hashing function within the sidelink feedback transmission occasion.

18. The UE of claim 1, wherein the one or more processors are individually or collectively further operable to execute the processor-executable code to cause the UE to:

determine the type of feedback information based at least in part on a first set of one or more sidelink feedback resources associated with the first sidelink message at least partially overlapping in time, frequency, or both, with a second set of one or more sidelink feedback resources associated with the second sidelink message within the sidelink feedback transmission occasion.

19. The UE of claim 1, wherein the provided type of feedback information comprises one of a positive acknowledgment, a negative acknowledgment, or a discontinuous transmission type.

20. A method for wireless communication by a user equipment (UE), comprising:

receiving a first sidelink message, the first sidelink message associated with a sidelink feedback transmission occasion;

receiving a second sidelink message, the second sidelink message also associated with the sidelink feedback transmission occasion; and providing a type of feedback information via the sidelink feedback transmission occasion based at least in part on the first sidelink message and the second sidelink message both being associated with the sidelink feedback transmission occasion, wherein the provided type of feedback information is based at least in part on a quantity of one or more additional sidelink feedback transmission occasions subsequent to the sidelink feedback transmission occasion that are also available for transmission of either first feedback associated with the first sidelink message or second feedback associated with the second sidelink message.

21. The method of claim 20, wherein providing the type of feedback information comprises:

performing discontinuous transmission during the sidelink feedback transmission occasion, wherein the provided type of feedback information comprises a discontinuous transmission type based at least in part on the first feedback comprising a positive acknowledgment and the second feedback comprising a negative acknowledgment and further based at least in part on at least one of the one or more additional sidelink feedback transmission occasions being available for transmission of the second feedback comprising the negative acknowledgment.

22. The method of claim 21, further comprising:

transmitting the second feedback comprising the negative acknowledgment via the at least one additional sidelink feedback transmission occasion based at least in part on performing the discontinuous transmission during the sidelink feedback transmission occasion.

23. The method of claim 21, wherein the first feedback and the second feedback both comprise unicast or groupcast feedback of a first type or a second type, the first type associated with indication of positive acknowledgments via discontinuous transmission and the second type associated with indication of positive acknowledgments via transmission of positive acknowledgments.

24. The method of claim 21, wherein:

the first feedback comprises unicast feedback or groupcast feedback of a second type, the second type associated with indication of positive acknowledgments via transmission of positive acknowledgments; and the second feedback comprises groupcast feedback of a first type, the first type associated with indication of positive acknowledgments via discontinuous transmission.

25. The method of claim 21, wherein:

the first feedback comprises groupcast feedback of a first type, the first type associated with indication of positive acknowledgments via discontinuous transmission; and the second feedback comprises unicast feedback or groupcast feedback of a second type, the second type associated with indication of positive acknowledgments via transmission of positive acknowledgments.

26. The method of claim 20, wherein providing the type of feedback information comprises:

transmitting a negative acknowledgment via the sidelink feedback transmission occasion, wherein the provided type of feedback information comprises the negative acknowledgment based at least in part on at least one of the first feedback and the second feedback comprising the negative acknowledgment.

27. The method of claim 20, wherein providing the type of feedback information comprises:

performing discontinuous transmission during the sidelink feedback transmission occasion, wherein the provided type of feedback information comprises a discontinuous transmission type based at least in part on both the first feedback and the second feedback comprising positive feedback of a feedback type that is associated with indication of positive acknowledgments via discontinuous transmission.

28. The method of claim 20, wherein providing the type of feedback information comprises:

transmitting a positive acknowledgment via the sidelink feedback transmission occasion, wherein the provided type of feedback information comprises the positive acknowledgment based at least in part on both the first feedback and the second feedback comprising the positive acknowledgment.

29. A user equipment (UE) for wireless communication, comprising:

means for receiving a first sidelink message, the first sidelink message associated with a sidelink feedback transmission occasion;

means for receiving a second sidelink message, the second sidelink message also associated with the sidelink feedback transmission occasion; and means for providing a type of feedback information via the sidelink feedback transmission occasion based at least in part on the first sidelink message and the second sidelink message both being associated with the sidelink feedback transmission occasion, wherein the provided type of feedback information is based at least in part on a quantity of one or more additional sidelink feedback transmission occasions subsequent to the sidelink feedback transmission occasion that are also available for transmission of either first feedback associated with the first sidelink message or second feedback associated with the second sidelink message.

30. A non-transitory computer-readable medium storing code for wireless communication by a user equipment (UE), the code comprising instructions executable by one or more processors to:

receive a first sidelink message, the first sidelink message associated with a sidelink feedback transmission occasion;

receive a second sidelink message, the second sidelink message also associated with the sidelink feedback transmission occasion; and provide a type of feedback information via the sidelink feedback transmission occasion based at least in part on the first sidelink message and the second sidelink message both being associated with the sidelink feedback transmission occasion, wherein the provided type of feedback information is based at least in part on a quantity of one or more additional sidelink feedback transmission occasions subsequent to the sidelink feedback transmission occasion that are also available for transmission of either first feedback associated with the first sidelink message or second feedback associated with the second sidelink message.

* * * * *